United States Patent
Konishi

(10) Patent No.: US 6,927,866 B2
(45) Date of Patent: *Aug. 9, 2005

(54) PRINT SYSTEM AND PRINTER

(75) Inventor: Shinji Konishi, Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,601

(22) Filed: Apr. 12, 1999

(65) Prior Publication Data

US 2004/0012807 A1 Jan. 22, 2004

(30) Foreign Application Priority Data

Apr. 10, 1998 (JP) ............................................ 10-099005
Mar. 17, 1999 (JP) ............................................ 11-072798

(51) Int. Cl.⁷ .............................. G06F 3/12; G06F 13/00
(52) U.S. Cl. ..................................... 358/1.13; 358/1.15
(58) Field of Search ............................... 358/1.13, 1.15, 358/1.16; 709/224, 1.15

(56) References Cited

U.S. PATENT DOCUMENTS

| | | | | |
|---|---|---|---|---|
| 5,533,175 A | * | 7/1996 | Lung et al. ................ | 395/115 |
| 5,664,222 A | | 9/1997 | Inakoshi | |
| 5,706,411 A | * | 1/1998 | McCormick et al. ....... | 395/113 |
| 5,727,135 A | | 3/1998 | Webb et al. | |
| 6,021,429 A | * | 2/2000 | Danknick ................... | 709/208 |
| 6,055,361 A | * | 4/2000 | Fujita et al. ................ | 395/114 |
| 6,336,141 B1 | * | 1/2002 | Fujiyama et al. ........... | 709/224 |
| 6,433,884 B1 | * | 8/2002 | Kawakami .................. | 358/1.15 |

FOREIGN PATENT DOCUMENTS

| | | | | |
|---|---|---|---|---|
| EP | 0 675 427 A2 | 10/1995 | ............. | G06F/3/12 |
| EP | 0 982 650 A1 | 3/2000 | ............. | G06F/3/12 |
| JP | 6-214914 | 8/1994 | ........... | G06F/13/00 |
| JP | 8-179969 | 7/1996 | ........... | G06F/11/30 |
| JP | 8-267877 | 10/1996 | | |
| JP | 8-292850 | 11/1996 | | |
| JP | 9-311770 | 12/1997 | | |
| JP | 11-73280 | 3/1999 | ............. | G06F/3/12 |

OTHER PUBLICATIONS

Printer Job Language Technical Reference Manual (Hewlett Packard, Edition 10).

* cited by examiner

*Primary Examiner*—Douglas Tran
(74) *Attorney, Agent, or Firm*—Sughrue Mion, PLLC

(57) ABSTRACT

There is provided a print system comprising a host computer and a printer for receiving print data from the host computer and printing based on the print data, characterized by a print data generation section for generating print data, a reply information issuance section for issuing reply information at a predetermined position of print job data containing the print data, print data processing section for interpreting the print data, detecting the reply information from the print job data, and returning the reply information to a predetermined destination, a print engine for printing based on interpretation of the print data processing section, and job processing state monitor section for monitoring the processing state of the print job data based on the reply information returned from the print data processing section.

31 Claims, 28 Drawing Sheets

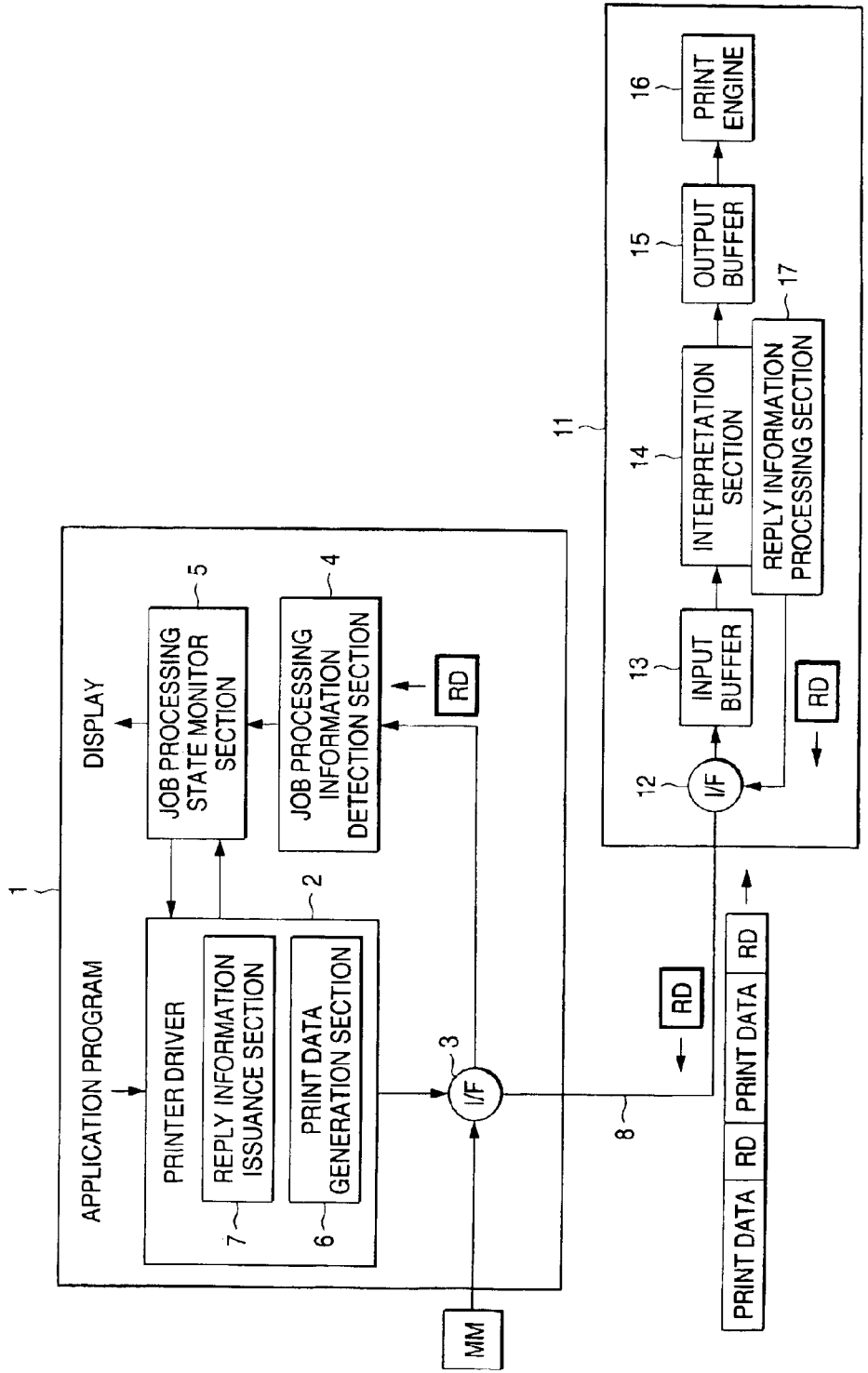

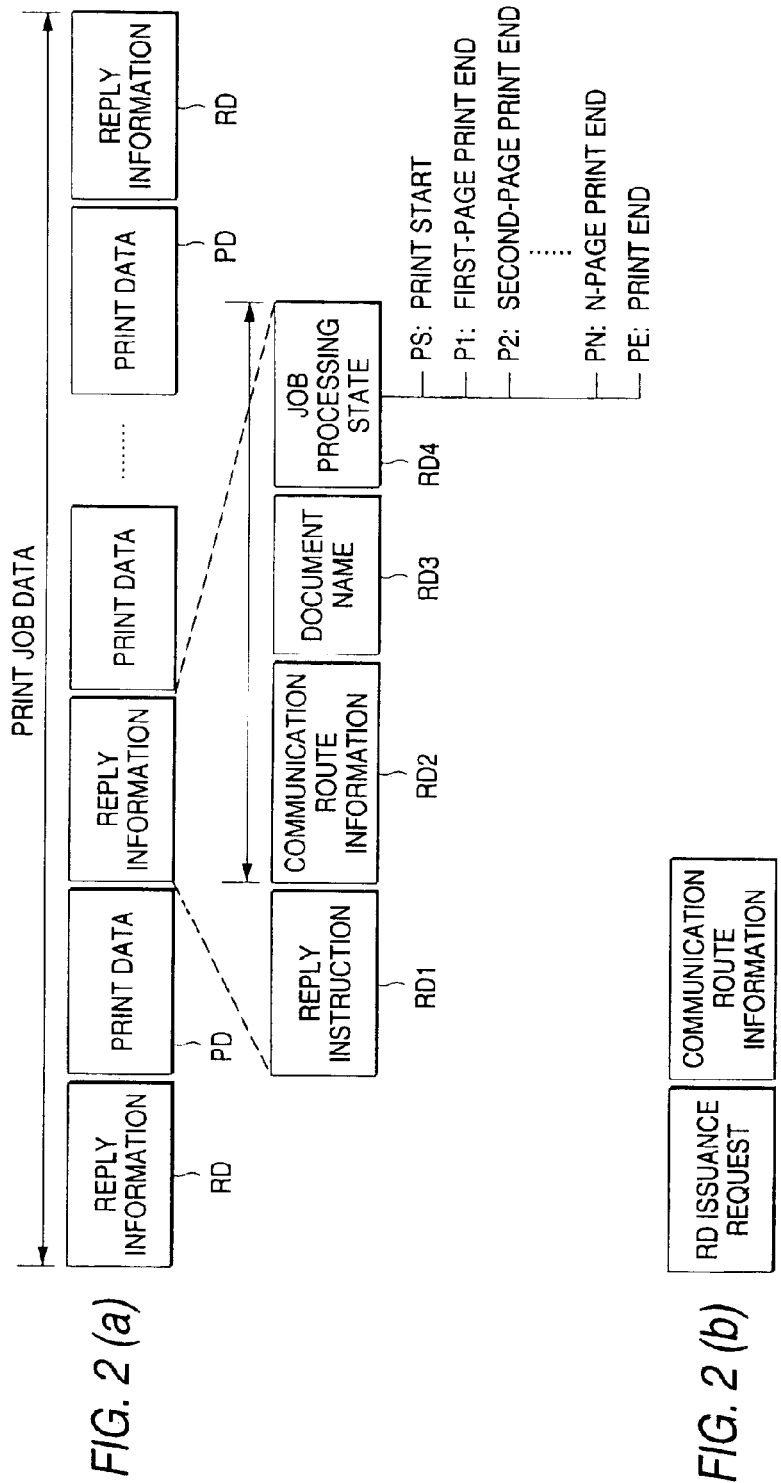
FIG. 2(a)
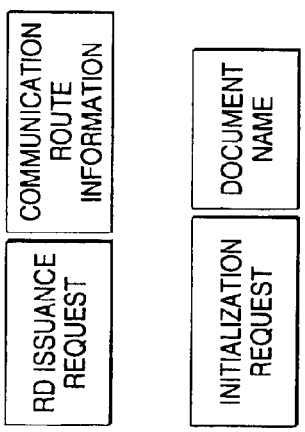
FIG. 2(b)
FIG. 2(c)

PRINT SYSTEM AND PRINTER

BACKGROUND OF THE INVENTION

1. Field of the Invention

This invention relates to a print system, a printer, a print method, and a print data generation system and in particular to a print system, a printer, a print method, and a print data generation system for making it possible to monitor the processing state of a print job.

2. Description of the Related Art

In recent years, a print system for printing via a network, such as a LAN (local area network), has become pervasive as the network technology has moved forward. In such a print system, print data generated in a host computer is transmitted via a network to a printer for carrying out a print job. Since any desired printer connected to the network can be used in the network print system, the host computer issuing a print job and the printer receiving the print job instruction may be away from each other depending on printer selection. If the host computer and the printer are away from each other, the user cannot visually check the progress state of a print job easily, namely, the ease of use is poor.

Then, for example, as described in JP-A-8-272557; JP-A-8-305520, etc., various systems for monitoring the processing state of a print job are proposed. For example, a printer is provided with a management table for managing print jobs, a program for detecting the job processing state, and the like, whereby the printer can be made to detect the processing state of a print job singly. Alternatively, a print server is provided on a network and all print jobs are transmitted through the print server to printers, whereby the print jobs on the network can also be managed in a unified way.

By the way, to make the printer itself monitor the processing state of a print job, computer resources of memory, a CPU (central processing unit), etc., are required as much as the installed print job management function, thus the printer configuration becomes complicated and costs are also increased. Once such an intelligent printer is placed on distribution, it is virtually difficult to change the print job management function, thus the intelligent printer lacks flexibility as a job management system.

On the other hand, to provide the print server on the network, the print jobs on the network can be managed in a unified way, but a storage unit for retaining all print jobs and the like become necessary. Thus, if the dedicated print server is provided, costs are increased. Since all print jobs are transmitted through the print server to printers to manage the print jobs in a centralized manner, network traffic increases drastically and there is a possibility that print efficiency may be degraded. That is, print data generated in a host computer is first transmitted to the print server, next transmitted to the printer specified from the print server. Therefore, the same data is distributed twice on the network and the communication traffic is doubled. If the communication capacity is improved in response to an increase in the traffic, costs furthermore grow; on the other hand, if the communication capacity is not improved, the processing speed of the whole system lowers. Further, since the print server manages the print jobs in a unified way, if some fault occurs in the print server, the network print system cannot be operated; the system including the print server also lacks fault tolerance.

SUMMARY OF THE INVENTION

It is therefore an object of the invention to provide a print system, a printer, a print method, and a print data generation system for making it possible to easily and accurately monitor the processing state of a print job. To accomplish the object, in a print system according to the invention, reply information is placed in a predetermined position of print job data, so that the user can keep track of the print job progress state.

According to the invention, there is provided a print system comprising a host computer and a printer for receiving print data from the host computer and printing based on the print data, characterized by print data generation means for generating print data, reply information issuance means for issuing reply information at a predetermined position of print job data containing the print data, print data processing means for interpreting the print data, detecting the reply information from the print job data, and returning the reply information to a predetermined destination, print control means for printing based on interpretation of the print data processing means, and job processing state monitor means for monitoring the processing state of the print job data based on the reply information returned from the print data processing means.

The term "reply information" means information returned to a predetermined destination. The reply information is issued at a predetermined position of the print job data containing the print data. For example, the "predetermined position" can be a position such as the print job start (job start) and end (job end) or the top or last of each print page or a position following a print instruction of paper feed, paper eject, page feed, line feed, carriage return, etc.

The print data processing means interprets the print data in the print job data, detects the reply information contained in the print job data, and returns the reply information to the predetermined destination. Since the reply information is placed in the predetermined position of the print job data, the print job progress state can be known by receiving the reply information. Therefore, the job processing state monitor means can monitor the processing state of the print job data based on the returned reply information. That is, since the reply information is previously embedded in the predetermined position of the print job data, the print job data is simply processed by the print data processing means, whereby the reply information can be returned. Thus, the print job processing state can be monitored. That is, the data amount of the print job data is increased as much as the data amount of the embedded reply information, but the print job processing state can be monitored without placing a management table for managing the job progress in a printer or providing a dedicated print server.

The print data processing means can return the reply information after completion of processing of the print data. That is, a time lag can occur between the print data processing means interpreting the print data and the print control means actually executing print. Particularly in the configuration of a parallel operation type wherein the print data processing means and the print control means can operate separately in parallel, the reply timing of the reply information and the actual print timing of the print control means differ easily. Then, the print data processing means returns the reply information after completion of processing of the print data, whereby the reply timing of the reply information and the actual print timing can be brought close to each other for enhancing the monitor accuracy of the job processing state.

For example, if the reply information is related to the print data concerning the print operation of paper feed, paper eject, page feed, line feed, carriage return etc., the print data processing means can also check execution of the print data concerning the print operation before returning the reply information.

Further, if the reply information issuance means issues timing specification information in addition to the reply information, the print data processing means can also return the reply information at the return timing specified on the timing specification information. The return timing of the reply information can be specified on the timing specification information after completion of the print data.

The reply information issuance means can issue the reply information and the timing specification information so that the print data is placed between the reply information and the timing specification information, whereby the print data to be returned with delay can be indicated easily. Further, if the reply information issuance means issues the timing specification information and the reply information so that the timing specification information, the print data, and the reply information are processed in this order, the control structure of the printer can be simplified. That is, when the print data processing means receives the timing specification information, it can input the print data together with a request for sending a notification of the processing completion of the print data into the print control mans.

On the other hand, the print system can further include reply information detection means for detecting the reply information returned from the print data processing means and sending the detected reply information to the job processing state monitor means.

The "reply information detection means" is means for relaying reply information rather than means for retaining and managing print data like a print server in related art. The reply information detection means is placed between the print data processing means and the job processing state monitor means for detecting reply information and sending the reply information to the job processing state monitor means, whereby not only the job processing state monitor means involved in issuing a print job, but also any other job processing state monitor means can monitor the print job processing state. That is, if the destination to which reply information is to be returned is preset in the reply information detection means and the communication route between the reply information detection means and each of a plurality of the job processing state monitor means is preset, the print data processing means needs only to return the reply information to the reply information detection means, whereby the reply information is sent from the reply information detection means to each job processing state monitor means and the print job progress state can be monitored by a plurality of the job processing state monitor means.

The print system can also be of a configuration in which the host computer comprises the print data generation means, the reply information issuance means, the job processing state monitor means, and the reply information detection means, and the printer comprises the print data processing means.

That is, the printer is provided only with the print data processing means for processing print data and returning reply information and the processing state of a network print job can be monitored.

Alternatively, the print system can also be of a configuration in which the host computer comprises the print data generation means, the reply information issuance means, and the job processing state monitor means, and the printer comprises the print data processing means and the reply information detection means.

The reply information may contain job processing information for indicating the processing state of print job data and a reply instruction for instructing the job processing information to be returned.

Thus, when the print data processing means interprets the reply instruction, it can return only the job processing information to the job processing state monitor means or the reply information detection means mechanically.

The job processing information may contain communication route information to a predetermined destination.

That is, only the communication route information to a predetermined destination may be stored in the job processing information. If the position where reply information is embedded is known, for example, as the reply information is embedded for each print page, the job processing state monitor means can detect the print job processing state only by counting the number of times the job processing information has been received.

The job processing information can further contain processing position information of print job data.

The "processing position information" means information indicating the processing position of print job data; in other words, it is information indicating the position where reply information is embedded. According to the processing position information, even the job processing state monitor means to which the position where reply information is embedded (issued) is not previously sent can easily keep track of the print job processing state based on the job processing information.

The processing position information may be provided as character code information.

From the viewpoint of lessening the data amount of the job processing information, preferably the processing position information is represented as compressed information. If the correspondence is previously defined, for example, as "11111" indicates "job start", "00000" indicates "job end," "00001" indicates the first page, and "00010" indicates the second page, the print job processing position can be indicated in a small information amount. In this case, however, a correspondence table for converting the compressed processing position information needs to be installed in the job processing state monitor means. Then, the processing position information is provided as character code information. That is, it is provided as a message for indicating the print job progress state, such as "print start," "first-page print end," "second-page print end," or "print end," whereby although the data amount of the job processing information increases, a correspondence table need not be provided and the print job processing state can be displayed promptly for the user.

The job processing information can further contain document information relevant to print job data.

According to the job processing information, which print job is printed to what extent can be understood easily. To monitor the processing state of more than one print job, the progress state of one document can be distinguished easily from that of another document.

The job processing information can further contain status information of the printer.

For example, the ink remaining amount, the toner remaining amount, the paper remaining amount, etc., can be named as the "status information." The printer status information is contained in the job processing information, whereby the print job processing state and the printer print state can be monitored.

On the other hand, reply information can be issued for each print page of the print job data.

The reply information is embedded in the print job data in correspondence with each page, so that the processing state can be grasped easily in page units.

The reply information can also be issued corresponding to one or more pages of the print job data based on the document attributes relevant to the print job data.

The "document attributes" in the expression "based on the document attributes" mean various attributes, such as the total number of pages, color or monochrome, the number of print colors, and the data amount per page of the document to be printed, based on which the reply information is issued. For example, if high-speed print, urgent print, etc., can be specified, the attributes can also be added for determining the reply information issuing position.

Specifically, for example, if the document has few pages, reply information is issued for each page; if the document has a large number of pages, reply information can be assigned to multiple pages as one group, for example, every even page, every odd page, or every predetermined number of pages. In doing so, the monitor accuracy of the job processing state is degraded, but the occupation percentage of the reply information in the print job data can be lessened. The reply information issuing mode can also be changed based on more than one attribute of a document. For example, for monochrome print, the reply information issuing position can also be changed in response to the number of pages; for color print, the reply information can also be issued for each page as a rule.

The invention can also be grasped as a printer, a print method, and a print data generation system. It can also be embodied by reading a predetermined program recorded on a recording medium into a computer of a printer.

Various recording media such as floppy disk, CD-ROM, hard disk, magneto-optic disk, magnetic tape, and memory can be used as the recording media. A communication medium may be used in such a manner that a program is downloaded on a communication line, for example.

BRIEF DESCRIPTION OF THE DRAWINGS

FIG. 1 is a block diagram to show a print system according to a first embodiment of the invention;

FIG. 2(a)–FIG. 2(c) are schematic representations to show the formats of printjob data, etc., in the first embodiment of the invention;

DESCRIPTION OF THE PREFERRED EMBODIMENTS

Figure 3:
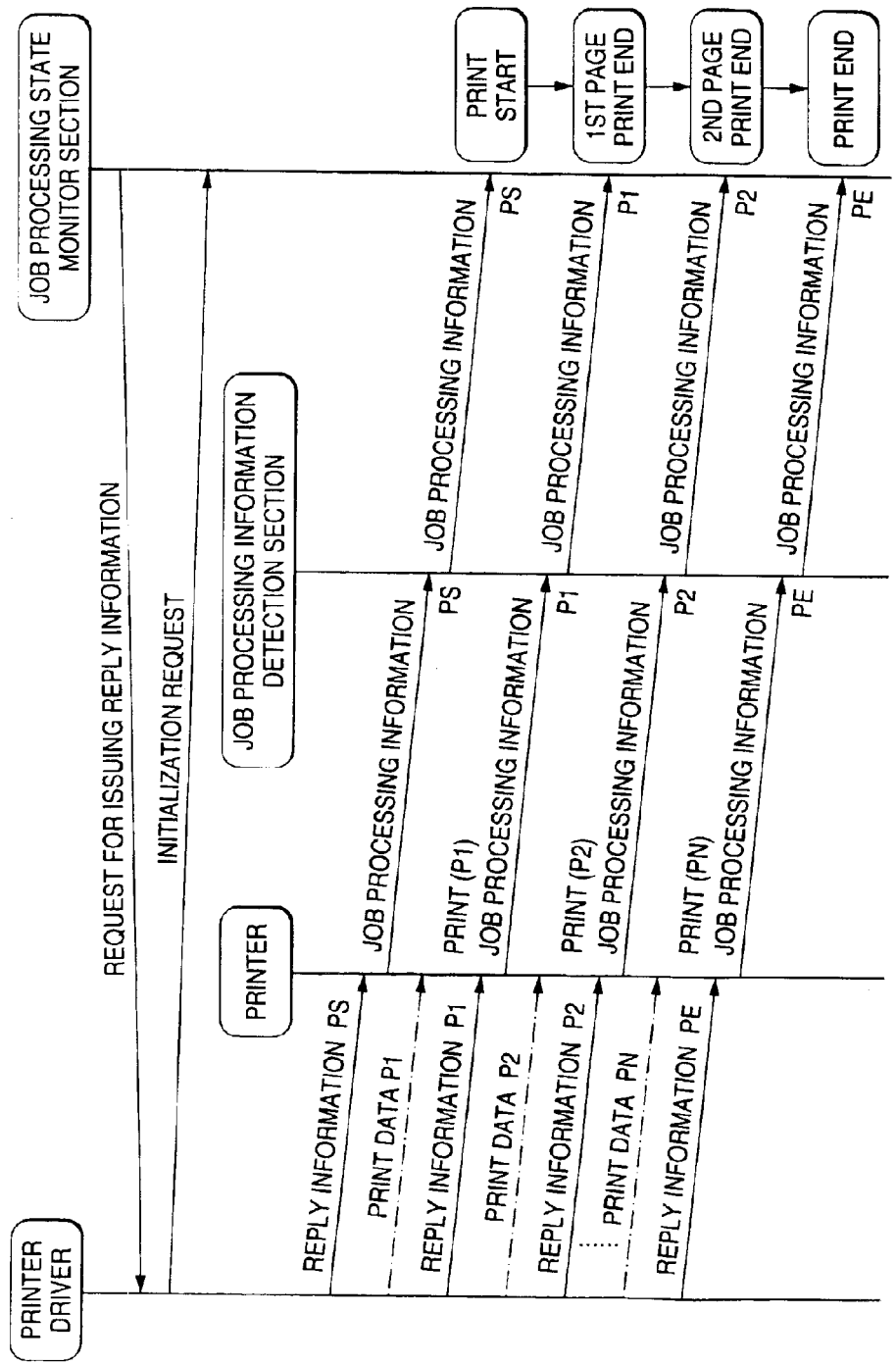
FIG. 3 is a schematic representation to show a general flow of data processing in the first embodiment of the invention.

Referring now to the accompanying drawings, there are shown preferred embodiments of the invention.

1. First Embodiment

FIGS. 1 to 7 relate to a first embodiment of the invention. FIG. 1 is a block diagram to show the whole of a print system according to the first embodiment.

A host computer 1 as a "print data generation system" is realized, for example, as a personal computer, a workstation, etc. The host computer 1 is provided with a printer driver 2, an interface (I/F) 3 as "transmission means," a job processing information detection section 4, and a job processing state monitor section 5.

The printer driver 2 generates print job data and transmits the data by using computer resources of a CPU, memory, etc., contained in the host computer 1. It is provided with a print data generation section 6 and a reply information issuance section 7 as internal functions. The print data generation section 6 as "print data generation means" converts document data input from an application program of document preparation software, etc., into print data. The reply information issuance section 7 as "reply information issuance means" generates reply information to be returned by a printer 11 and places the reply information in a predetermined position in the print job data. In the figures, the reply information and the print data are also represented as RD and PD respectively, and the reply information and job processing information are not strictly distinguished from each other.

The job processing information detection section 4 as "reply information detection means" detects job processing information returned from the printer 11 and sends the detected job processing information to the job processing state monitor section 5. That is, the job processing information detection section 4 executes a function of relaying the job processing information returned from the printer 11 and can also be represented as "relay means," for example.

The job processing state monitor section 5 as "job processing state monitor means" requests the reply information issuance section 7 to issue reply information and monitors the print job processing state based on the job processing information sent from the job processing information detection section 4, then causes the monitor result to be displayed on a display, etc.

The printer 11 comprises an I/F 12, an input buffer 13, an interpretation section 14, an output buffer 15, and a print engine 16. The interpretation section 14 is provided with a reply information processing section 17 for detecting reply information and returning the reply information as "print data processing means." The print job data input from the host computer via a communication line 8 is stored in the input buffer 13 through the I/F 12. The print job data stored in the input buffer 13 is sent to the interpretation section 14 for interpreting the print job data.

The interpretation section 14 interprets the print data, generates image data for printout, and writes the image data into the output buffer 15. The print engine 16 prints on a print recording medium based on the image data expanded in the output buffer 15. On the other hand, if the print job data contains reply information, the reply information processing section 17 detects the reply information and returns the reply information through the I/F 12 to the host computer 1. The print engine 16 may be, for example, an engine for printing in page units, such as a laser page printer, or an engine for executing serial print, such as an ink jet printer. The invention can be applied to either case.

Next, the formats of print job data, etc., will be discussed with reference to FIG. 2. First, FIG. 2A shows the format of print job data transmitted from the host computer 1 to the printer 11. The print job data consists of reply information RD and print data PD. The reply information RD is provided for each print page in addition to the print job start position (job start) and the print job end position (job end).

The reply information RD consists of four data areas RD1 to RD4, for example. The top data area RD1 stores a reply instruction. The data area RD2 stores communication route information. The data area RD3 stores a document name. The last data area RD4 stores a job processing state as "processing position information." The areas RD2 to RD4 make up "job processing information." When the reply information processing section 17 detects a reply instruction, it returns the areas RD2 to RD4 to the return destination indicated on the communication route information in accordance with the reply instruction. Information for indicating the progress state of the print job is set in the job processing state in the area RD4. For example, PS indicating the print start is set in the top reply information and PE indicating the print end is set in the last reply information. In the reply information issued at the end of each print page, information P1–PN for indicating the print end of the page is set. Therefore, the host computer 1 can keep track of the progress state of the print job by detecting the job processing state from the returned job processing information.

FIG. 2B shows the format of a reply information issuance instruction transmitted from the job processing state monitor section 5 to the reply information issuance section 7. The job processing state monitor section 5 makes a request for issuing reply information before print job data is generated. When the request for issuing reply information is made, information of the communication route to return a reply instruction is contained. Either of at least the following methods is possible as a method of setting the communication route information: In one method, the communication route between the job processing information detection section 4 and the job processing state monitor section 5 is defined therebetween separately and only the route information to the job processing information detection section 4 is set as the communication route information of reply information. In the other method, the route information to the job processing information detection section 4 and that to the job processing state monitor section 5 are set as the communication route information of reply information. Either method can be adopted.

FIG. 2C shows the format of an initialization instruction transmitted from the printer driver 2 to the job processing state monitor section 5. When the job processing state monitor section 5 receives the initialization instruction, it resets the displayed print job monitor state, sets a new document name received together with the initialization instruction, and monitors a new print job.

Next, the operation of the embodiment will be discussed with reference to FIGS. 3 to 7. First, a general flow of data processing will be discussed with reference to FIG. 3.

At the beginning of the flow, a request for issuing reply information is sent from the job processing state monitor section 5 to the printer driver 2, next an initialization request is sent from the printer driver 2 to the job processing state monitor section 5.

Next, as shown at the left of FIG. 3, the printer driver 2 generates print data based on an input document, places reply information in a predetermined position, and transmits the resultant print job data to the printer 11. As described previously with reference to FIG. 2A, the job processing state in the reply information stores position information on job processing corresponding to the issuance position of the reply information. In FIG. 3, the job start is represented as PS, the first page as P1, the second page as P2, the Nth page as PN, and the job end as PE. Therefore, when a print job is started, first the reply information with PS set in the job processing state is transmitted, next the first-page print data is transmitted. Likewise, after the print data of each page is transmitted, the reply information corresponding to the page is transmitted to the printer 11.

When detecting the reply information, the printer 11 extracts the job processing information except the reply instruction from the reply information and returns the job processing information to the job processing information detection section 4, which then sends the detected job processing information to the job processing state monitor section 5. Then, the job processing state monitor section 5 causes a processing status message such as PRINT START to be displayed on the display, etc. On the other hand, upon reception of print data, the printer 11 performs normal print data processing, interprets the print data, and causes the print engine 16 to print the print data.

Thus, the printer driver 2 places the reply information preceding and following the print data and transmits the print job data to the printer 11. The printer 11 interprets the print data, prints the print data, and detects the reply information, then returns the reply information to the job processing information detection section 4. Upon reception of the reply information (job processing information) through the job processing information detection section 4, the job processing state monitor section 5 causes a predetermined message to be displayed on the display, etc., based on the job processing state in the job processing information.

Figure 4:
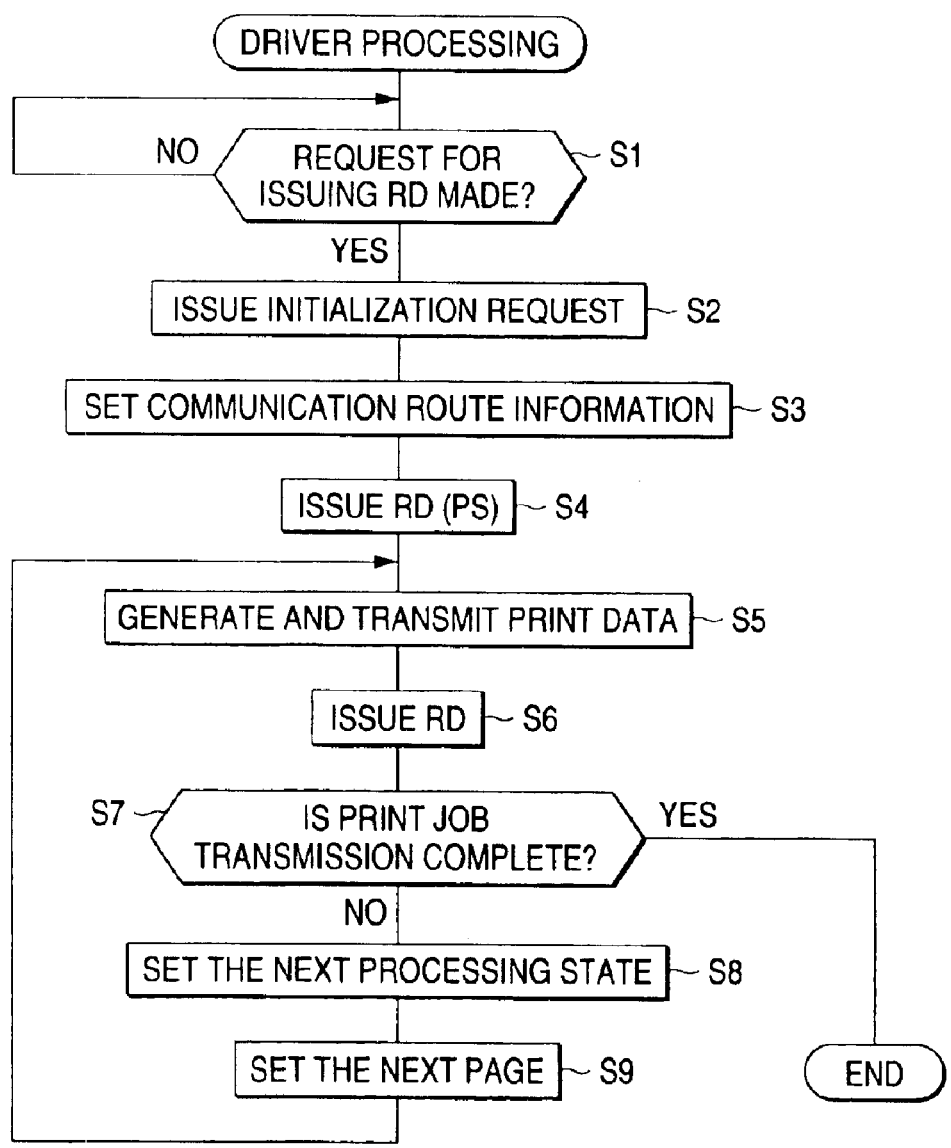
FIG. 4 is a flowchart to show driver processing in the first embodiment of the invention.

Next, FIG. 4 is a flowchart to show driver processing executed by the printer driver 2. First, at step S1, whether or not the job processing state monitor section 5 makes a request for issuing reply information is checked. If a request for issuing reply information is made, an initialization request is transmitted to the job processing state monitor section 5 at step S2.

Next, communication route information sent from the job processing state monitor section 5 is retained at step S3 and the first reply information, namely, the reply information with the job start stored as the job processing state is generated and is issued at step S4. Print data is generated and transmitted at step S5 and the reply information corresponding to the page is issued following the print data at step S6. Next, whether or not transmission of all print job data is complete is determined at step S7. If transmission of the print job data is not complete, the next processing state is set as the job processing state in the reply information at step S8 and the next page is set at step S9, then control returns to step S5. Steps S5 to S9 are repeated, whereby for each print page, the reply information corresponding to the page is issued.

Figure 5:
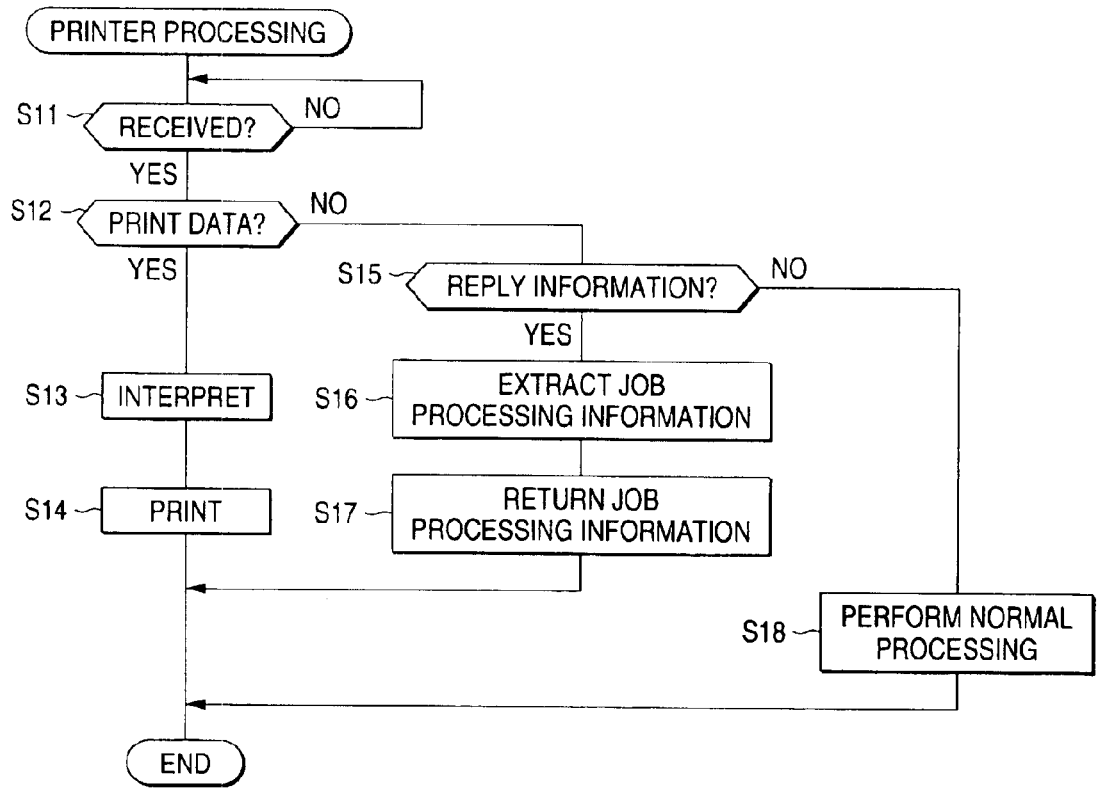
FIG. 5 is a flowchart to show printer processing in the first embodiment of the invention.

Next, FIG. 5 is a flowchart to show printer processing executed by the printer 11. First, the printer 11 checks whether or not data or an instruction is received from the host computer 1 at step S11. If data, etc., is received, the printer 11 determines whether or not print data is received at step S12. If the printer 11 determines that print data is received, it interprets the print data and generates image data for printout at step S13 and causes the print engine 16 to print the print data at step S14.

On the other hand, if the printer 11 determines that information other than print data is received, it goes from step S13 to step S15 and determines whether or not the received information is reply information. If the printer 1 determines that reply information is received, it extracts job processing information from the reply information at step S16 and returns the job processing information to the job processing information detection section 4 at step S17.

If the received information from the outside is neither print data nor reply information, the printer 11 performs normal processing at step S18. That is, for example, if a print stop instruction, a printer status inquiry instruction, etc., is input, normal processing responsive to the instruction is executed. Thus, the printer 11 interprets and prints the input print data and detects reply information, then returns the reply information to a predetermined destination mechanically.

Figure 6:
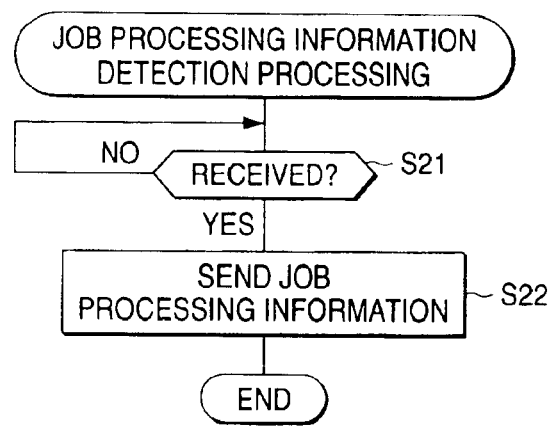
FIG. 6 is a flowchart to show detection processing of job processing information in the first embodiment of the invention.

Next, FIG. 6 is a flowchart to show processing executed by the job processing information detection section 4. The job processing information detection section 4 checks whether or not data from the printer 11 is received at step S21. If the job processing information detection section 4 determines that data from the printer 11 is received, it sends the received data to the job processing state monitor section 5 at step S22. Thus, upon reception of job processing information from the printer 11, the job processing information detection section 4 sends the job processing information to the job processing state monitor section 5.

Figure 7:
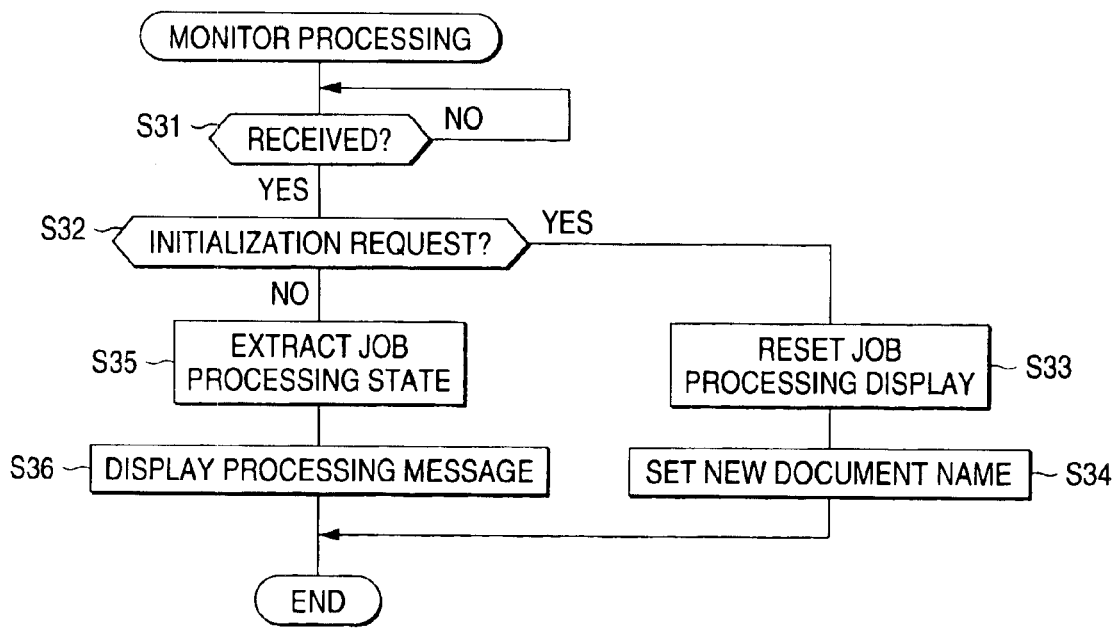
FIG. 7 is a flowchart to show monitor processing in the first embodiment of the invention.

Next, FIG. 7 is a flowchart to show monitor processing executed by the job processing state monitor section 5.

First, the job processing state monitor section 5 checks whether or not data, etc., is received at step S31. If data, etc., is received, the job processing state monitor section 5 determines whether or not an initialization request is received from the printer driver 2 at step S32. If the job processing state monitor section 5 determines that an initialization request is received, it resets the print job processing display at step S33 and sets a new document name sent from the printer driver 2 at step S34.

On the other hand, if the received data is not an initialization request, it means that job processing information is received from the job processing information detection section 4. Then, the job processing state monitor section 5 extracts the job processing state from the received job processing information at step S35 and causes a processing message responsive to the job processing state to be displayed on the display. For example, processing messages "PRINT IS STARTED," "FIRST-PAGE PRINT ENDS," "PRINT ENDS," etc., can be adopted. Thus, the job processing state monitor section 5 monitors the print job processing state based on the job processing information sent from the job processing information detection section 4 and causes the corresponding message to the processing state to be displayed on the display.

According to the described embodiment, the following advantages are provided:

First, the printer driver 2 places reply information in a predetermined position in print job data and transmits the print job data and the printer 11 detects the reply information and returns the reply information to the host computer 1. Thus, the print job progress state can be monitored easily and precisely without providing a high-performance printer or installing a dedicated print server. That is, the reply information previously embedded in the print job data is simply detected and returned mechanically, so that the job progress state need not be monitored by a special print job management program, etc. Undoubtedly, the print job data amount is increased as much as the inserted reply information amount. In the invention, however, a print job monitor program, a print job management table, and a dedicated print server need not be provided, thus the entire system costs can be decreased and the print processing speed can be increased.

Second, a dedicated print server need not be provided, so that the system costs can be reduced and the same print data is not distributed more than once on the network; an increase in the communication traffic can be prevented.

Third, the job processing information detection section 4 exhibits the relay function of only receiving job processing information from the printer 11 and sending the information to the job processing state monitor section 5 and unlike a print server, does not retain print job data. Therefore, as shown in FIG. 6, the job processing information detection section 4 may have the simple configuration and the load on a computer is light, so that the job processing information detection section 4 can be previously installed in a number of the host computers 1, etc., and fault tolerance can be improved drastically.

Fourthly, since the reply information is made up of a reply instruction and job processing information as shown in FIG. 2A, the printer 11 can extract the job processing information by detecting the reply instruction, and return the job processing information.

Fifthly, the job processing information stores the communication route information to the return destination, thus the job processing information can be returned to any desired destination simply by changing the contents of the communication route information, and a flexible monitor system can be constructed. That is, more than one host computer to which job processing information is returned may exist so long as the communication route information to the return destination is clearly shown; the embodiment can be applied to printers connected locally and printers connected to a network without restraint.

Sixthly, since the job processing information stores a document name, the name of the current document being printed can be known and the ease of use is improved.

Seventhly, reply information is issued for each print page, thus the print job progress state can be monitored in page units.

2. Second Embodiment

Figure 8:
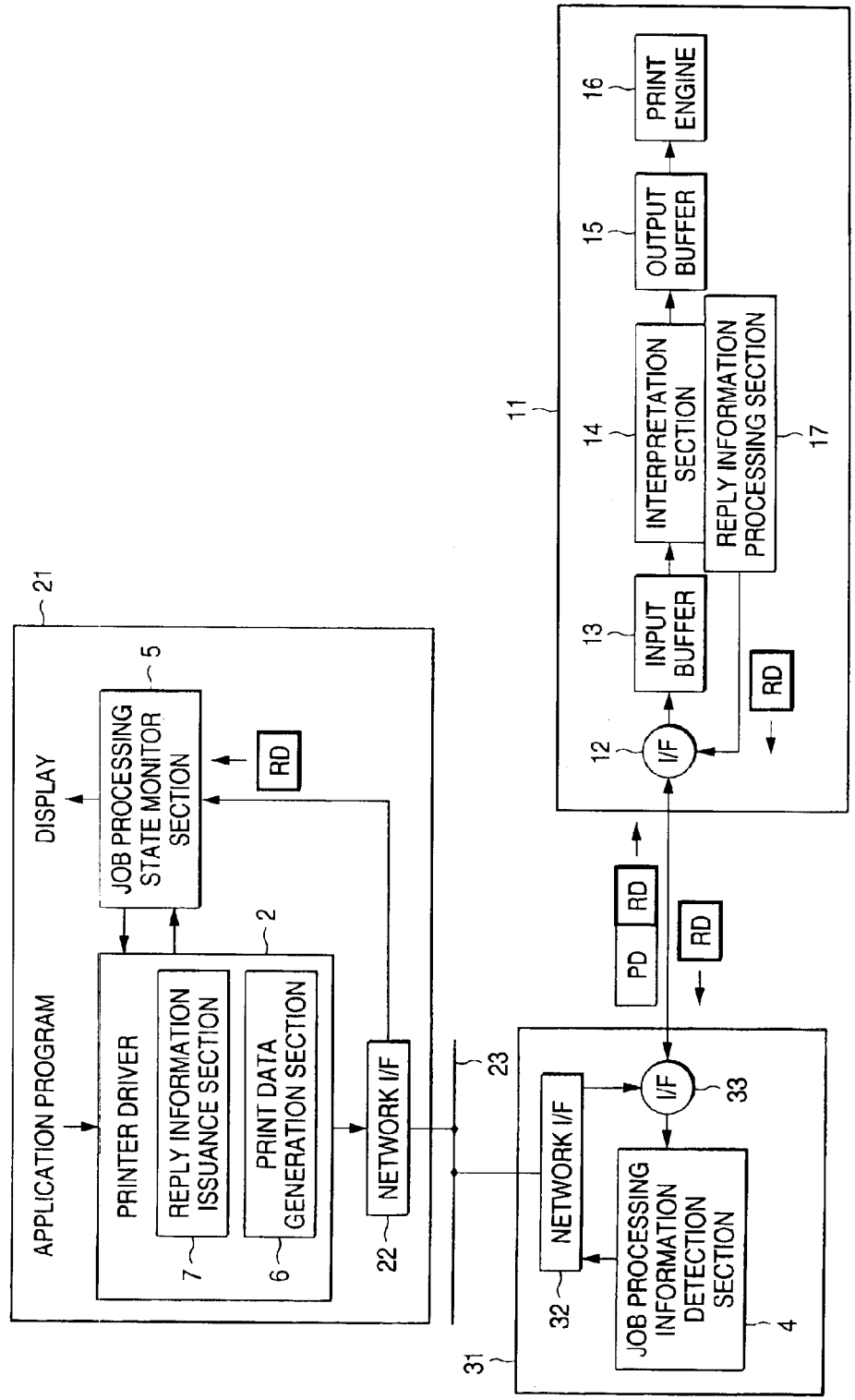
FIG. 8 is a block diagram of a print system according to a second embodiment of the invention.

Next, a second embodiment of the invention will be discussed with reference to FIG. 8. Components identical with those previously described with reference to FIG. 1 are denoted by the same reference numerals in the following accompanying drawings and will not be discussed again. The second embodiment is characterized by the fact that a job processing information detection section 4 is installed in another host computer to provide a relay server.

A host computer 21 according to the embodiment comprises a printer driver 2 and a job processing state monitor section 5. It further includes a-network I/F 22 for connecting to a network 23. The host computer 21 differs from the host computer 1 previously described in the first embodiment in that it does not comprise the job processing information detection section 4.

A relay server 31 is provided by installing the job processing information detection section 4 in a host computer other than the host computer 21. It is connected to the network 23 through a network I/F 32 and is also connected to a printer 11 through a local I/F 33. The relay server 31 detects job processing information from the printer 11 by the job processing information detection section 4 and sends the detected job processing information to a preset job processing state monitor section 5.

The described embodiment can also provide advantages similar to those of the first embodiment described above.

3. Third Embodiment

Figure 9:
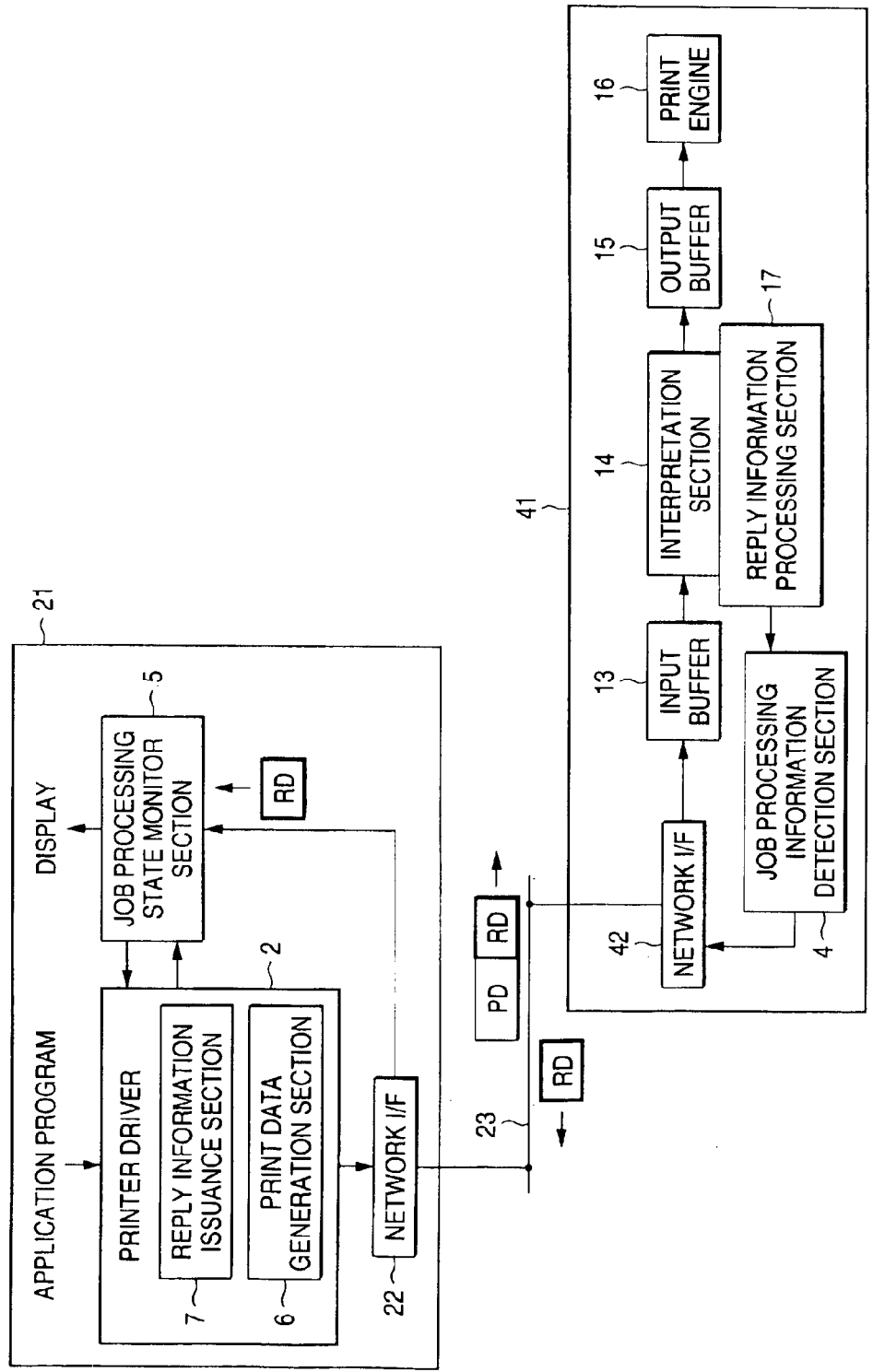
FIG. 9 is a block diagram of a print system according to a third embodiment of the invention.

Next, a third embodiment of the invention will be discussed with reference to FIG. 9. The third embodiment is characterized by the fact that a job processing information detection section 4 is installed in a printer.

A printer 41 according to the embodiment is connected to a network 23 through a network I/F 42 and comprises the job processing information detection section 4. That is, the job processing information extracted and sent by a reply information processing section 17 is detected by the job processing information detection section 4 in the printer 41 and is returned through the network 23 to a job processing state monitor section 5 of a host computer 21.

The described embodiment can also provide advantages similar to those of the first embodiment described above. The job processing information detection section 4, which has a simple configuration and does not much consume computer resources, can be installed in another host computer as shown in the second embodiment and can be installed in the printer 41 as shown in the third embodiment. In addition, the job processing information detection section 4 can also be installed separately in each of a number of computers and printers, in which case fault tolerance is improved drastically.

4. Fourth Embodiment

Figure 10:
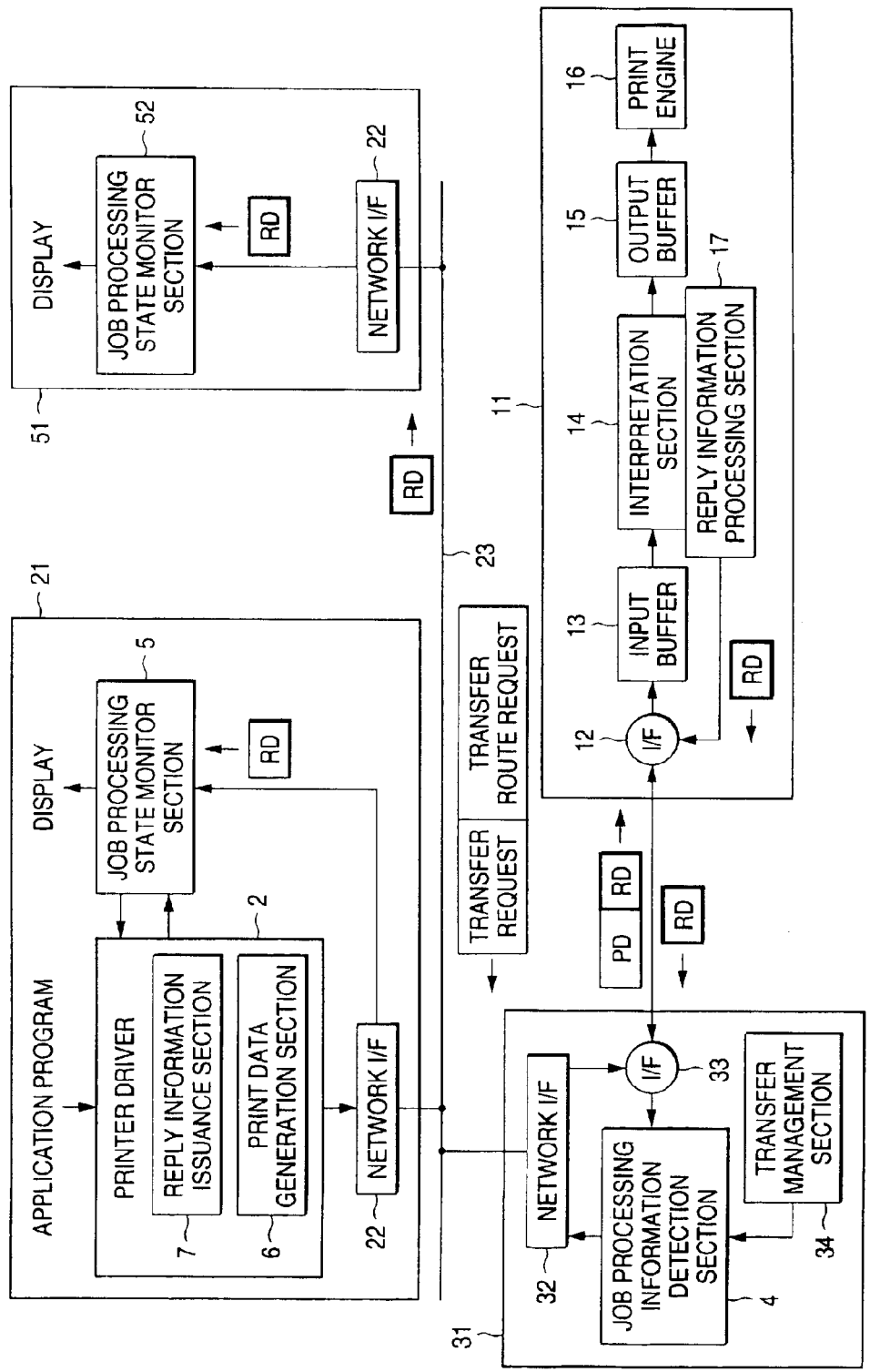
FIG. 10 is a block diagram of a print system according to a fourth embodiment of the invention.

Next, a fourth embodiment of the invention will be discussed with reference to FIGS. 10 to 12. The fourth embodiment is characterized by the fact that any other host computer than a host computer involved in printing can also monitor the processing state of a print job.

In the embodiment, in addition to a host computer 21 for generating print jobs, a relay server 31 for detecting and relaying job processing information and a host computer 51 which wants to monitor print jobs are provided.

A job processing information detection section 4 installed in the relay server 31 makes reference to a transfer management section 34 storing communication route information to destinations, etc., thereby sending job processing information to the host computer 21 involved in the print job and the host computer 51 not relating to the print job.

A job processing state monitor section 52 installed in the host computer 51 requests the relay server 31 to transfer job processing information, and monitors the print job progress state based on the job processing information transferred from the relay server 31. The job processing state monitor section 52 sends the communication route information to the destination together with the transfer request to the relay server 31 as shown in FIG. 10.

Figure 11:
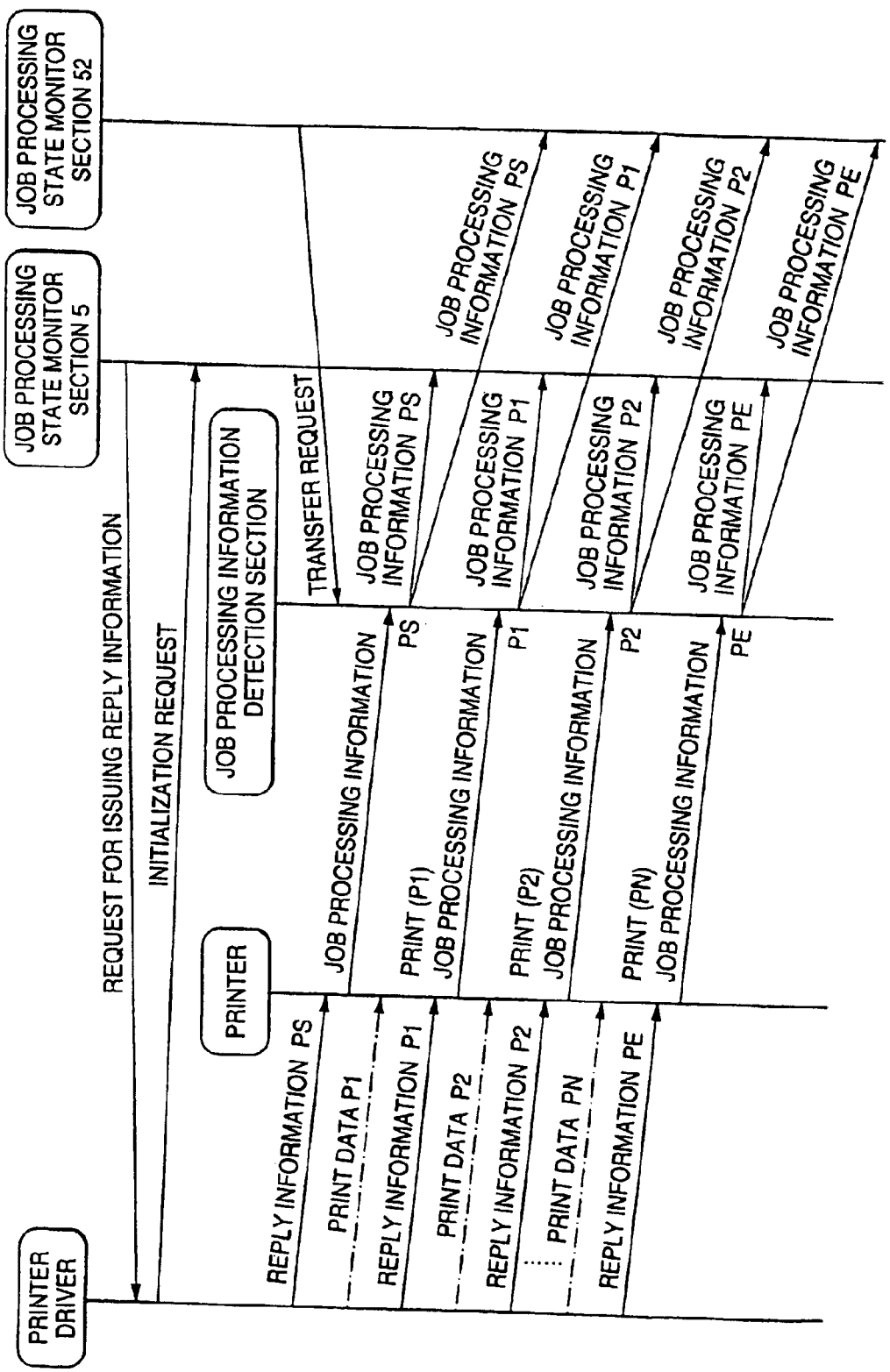
FIG. 11 is a schematic representation to show a general flow of data processing in the fourth embodiment of the invention.

FIG. 11 shows a general flow of data processing according to the embodiment. As shown here, the job processing information detection section 4 sends job processing information to a job processing state monitor section 5 involved in issuing a print job and also sends the job processing information to the job processing state monitor section 52 not relating to the print job.

Figure 12:
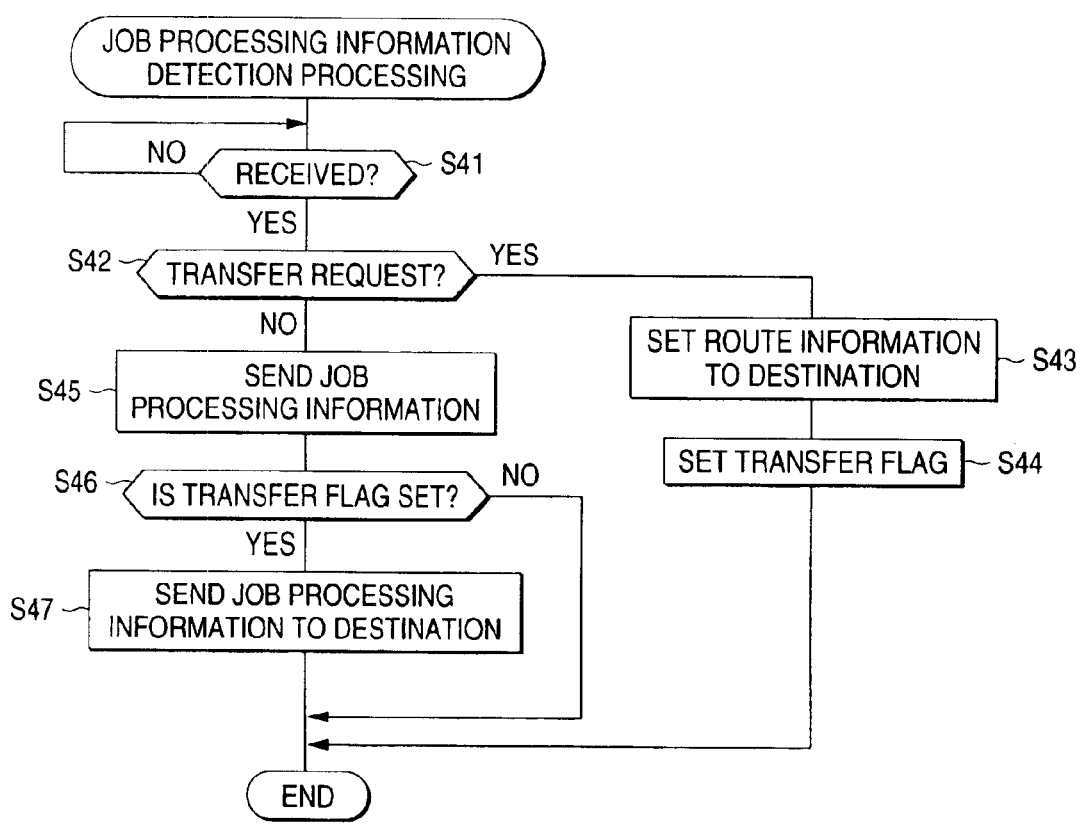
FIG. 12 is a flowchart to show detection processing of job processing information in the fourth embodiment of the invention.

FIG. 12 is a flowchart to show processing executed by the relay server 31. First, the relay server 31 checks whether or not data, an instruction, etc., is received from the outside at step S41. If data, an instruction, etc., is received, the relay server 31 determines whether or not a transfer request is received at step S42. If the relay server 31 determines that a transfer request is received, it sets the communication route information to the transfer requester in the transfer management section 34 at step S43 and also sets a transfer flag indicating that the transfer request is made at step S44.

On the other hand, if it is not determined at step S42 that a transfer request is received, it means reception of job processing information. Then, the relay server 31 sends the job processing information to the job processing state monitor section 5 of the host computer 21 involved in the print job at step S45. Next, the relay server 31 determines whether or not the transfer flag is set at step S46. If the transfer flag is set, the relay server 31 sends the job processing information to the transfer requester at step S47. If the transfer flag is not set, step S47 is skipped.

The described embodiment can also provide advantages similar to those of the first to third embodiments described above. In addition, in the fourth embodiment, a transfer request is previously issued to the relay server 31, whereby the print job processing state can also be monitored easily in the host computer 51. Therefore, the user, who can keep track of the operation state of the printer 11, can issue his or her print job while seeing the operation state of the printer 11; the ease of use is improved.

5. Fifth Embodiment

Figure 13:
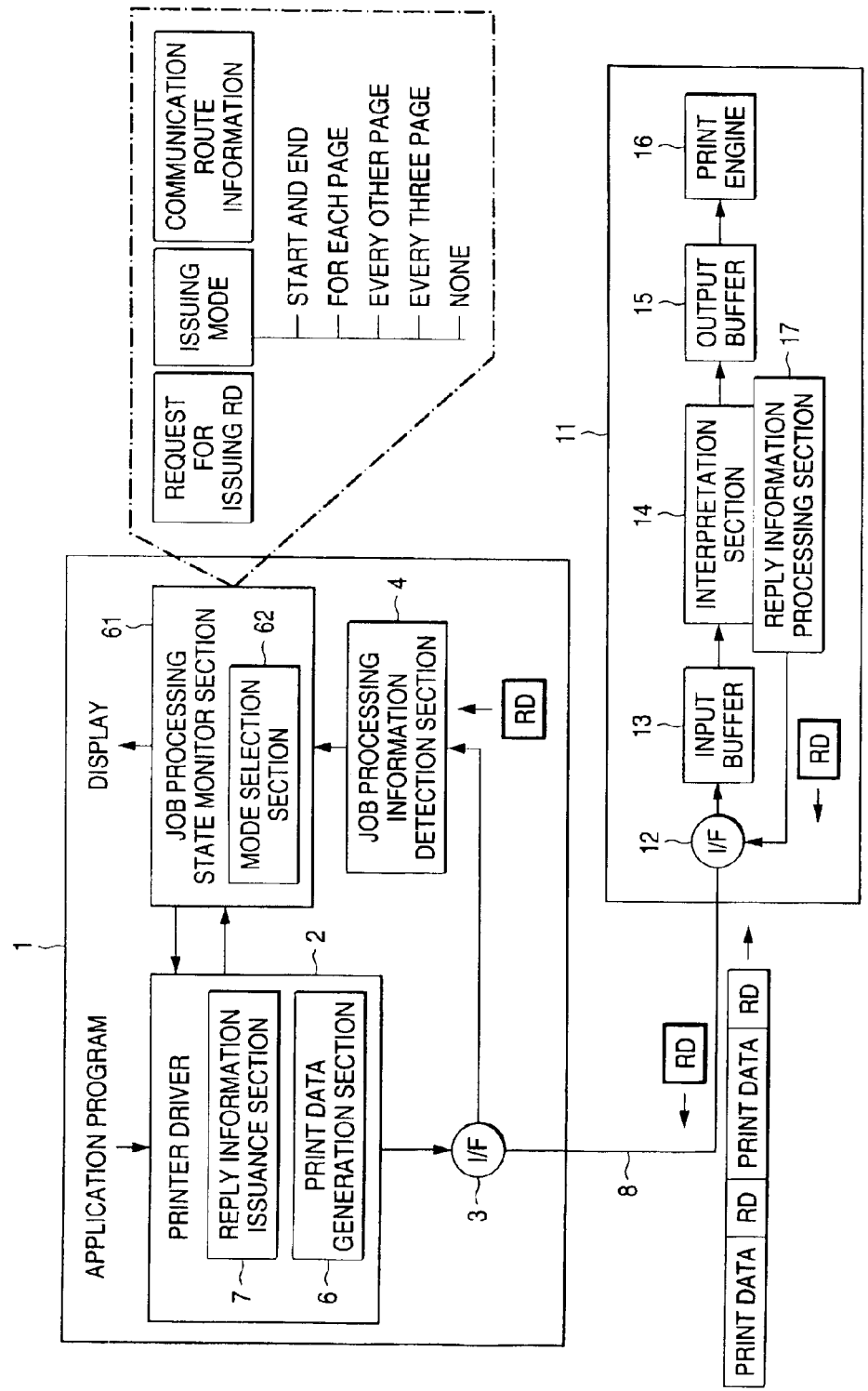
FIG. 13 is a block diagram of a print system according to a fifth embodiment of the invention.

Next, a fifth embodiment of the invention will be discussed with reference to FIGS. 13 to 15. The fifth embodiment is characterized by the fact that the issuing mode of reply information is changed in response to the attributes of a document.

Like the job processing state monitor section previously described in each of the embodiments, a job processing state monitor section 61 according to the embodiment monitors the print job processing state based on the job processing information sent from a job processing information detection section 4. In addition, the job processing state monitor section 61 is provided with a mode selection section 62 for selecting a reply information issuing mode as an internal function. The issuing mode information determined by the mode selection section 62 as well as the communication route information to the destination to which job processing information is to be returned are added to a request for issuing reply information, transmitted from the job processing state monitor section 61 to a printer driver 2.

For example, a mode of issuing reply information only at the job start and the job end, a mode of issuing reply information for each print page, a mode of issuing reply information every other page, a mode of issuing reply information every three pages, a mode of not embedding reply information in print job data, etc., can be named as a mode that can be selected by the mode selection section 62.

The mode selection section 62 selects any one mode from among the provided issuing modes based on document attribute information sent from the printer driver 2. For example, if the total number of pages is greater than a predetermined number of pages, the print job processing state can be monitored with multiple pages as one unit rather than for each page. If print takes much time as color print, the monitor accuracy may be enhanced by issuing reply information for each page regardless of how many pages are involved. Alternatively, communication traffic is detected and if the traffic increases, reply information can also be thinned out and issued.

Figure 14:
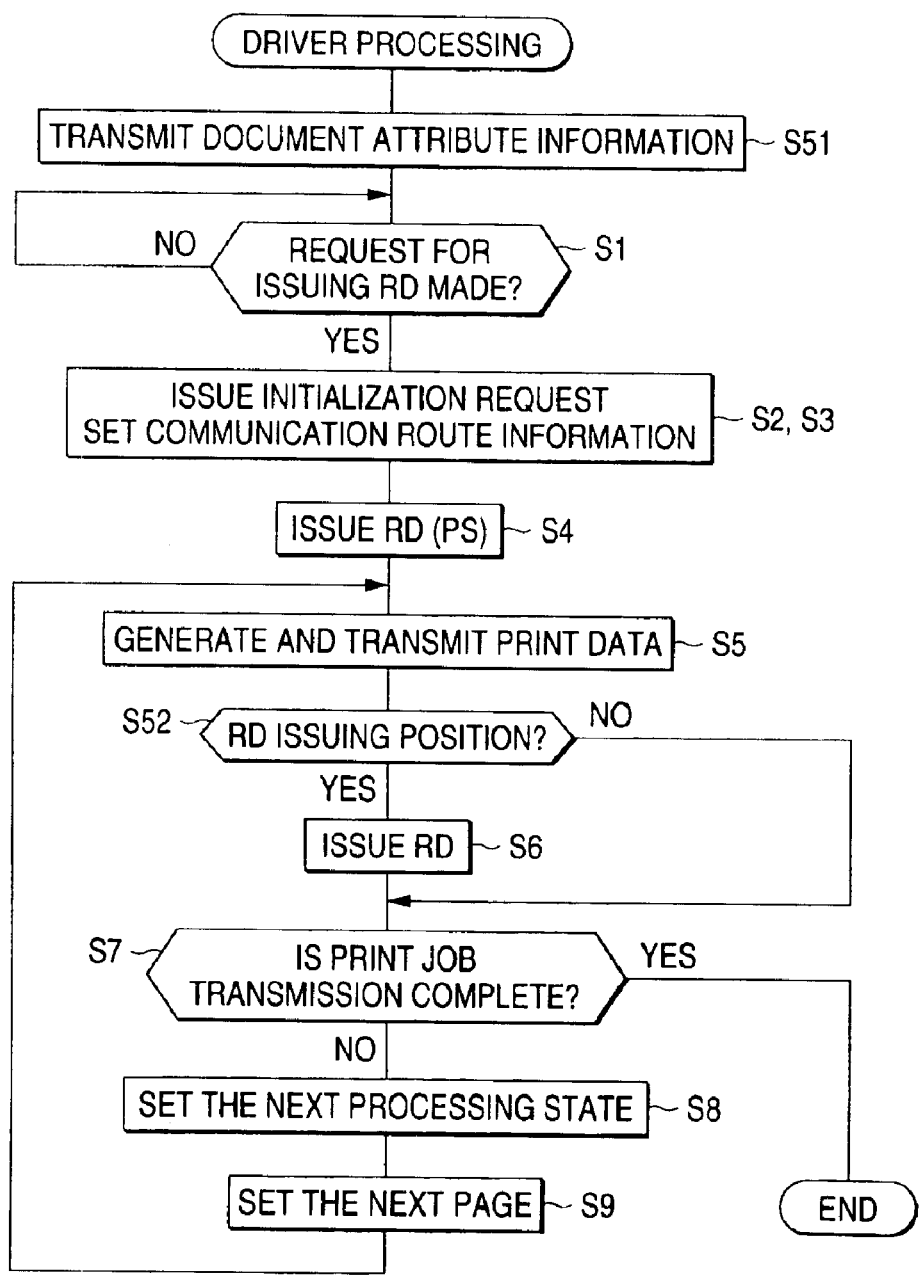
FIG. 14 is a flowchart to show driver processing in the fifth embodiment of the invention.

FIG. 14 is a flowchart of driver processing according to the embodiment. The processing comprises all steps of S1 to S9 shown in FIG. 4. In addition, in the processing, first the attribute information of the document to be printed is sent to the job processing state monitor section 61 at step S51. Here, for example, the total number of pages, monochrome or color, the total data amount, etc., can be adopted as the document attribute information.

Next, an initialization request is made, then print data is generated and is transmitted to a printer 11 at steps S1–S5. In the embodiment, step S5 is followed by step S52 at which whether or not the position is the reply information issuing position is determined. Reply information is issued at step S6 only if the position is the issuing position defined depending on the issuing mode.

FIG. 14 shows as if the reply information at the job start time were always issued at step S4, but it is for convenience of the description; step S4 is omitted whenever necessary depending on the selected issuing mode.

Figure 15:
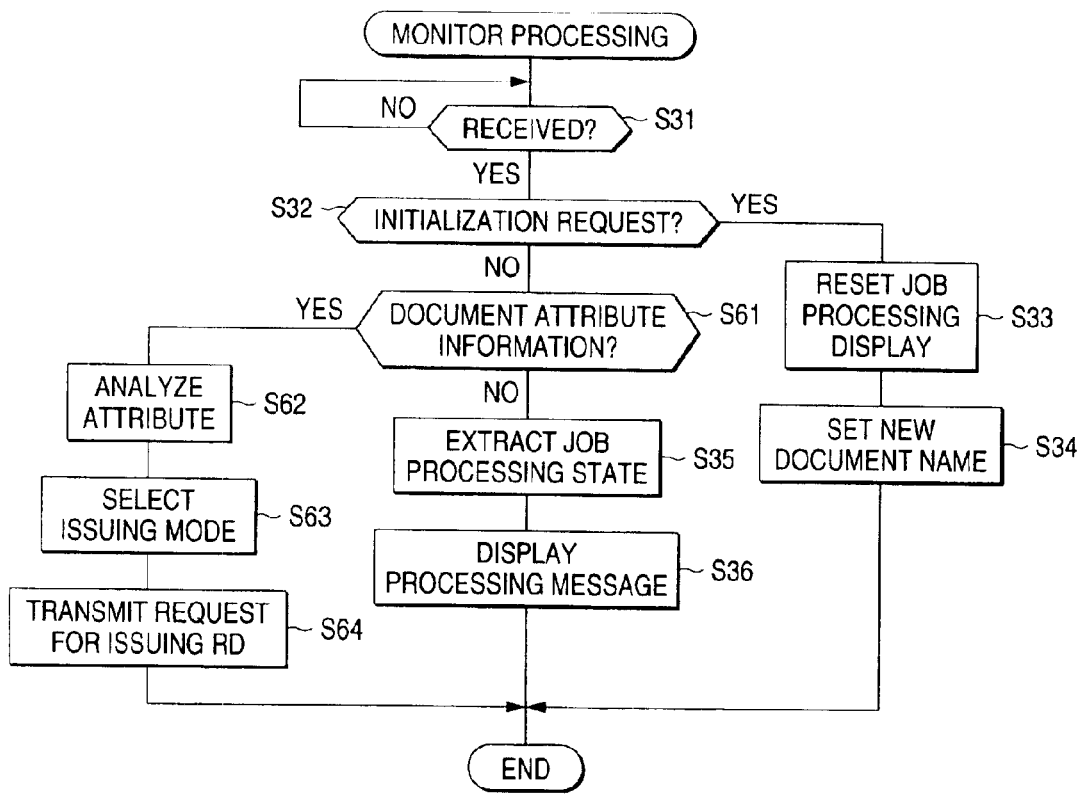
FIG. 15 is a flowchart to show monitor processing in the fifth embodiment of the invention.

Next, FIG. 15 is a flowchart of monitor processing according to the embodiment. The processing comprises all steps of S31 to S36 shown in FIG. 7. In addition, in the embodiment, whether or not document attribute information is sent from the printer driver 2 is determined at step S61 between steps S32 and S35. If it is determined that the attribute information is received, the attribute information is analyzed at step S62, the issuing mode fitted to the attribute is selected at step S63, and a request for issuing reply information comprising the selected issuing mode is transmitted to the printer driver 2 at step S64.

The described embodiment can also provide advantages similar to those of the first embodiment described above. In addition, in the fifth embodiment, the reply information issuing mode is changed in response to the attribute of the document to be printed, so that the optimum issuing mode can be selected in response to the number of pages of the document, the print color size, the data amount, etc. The reply information is thinned out and issued, whereby the occupation percentage of the reply information in the print job data can be lowered for enhancing the communication efficiency although the print job monitor accuracy is degraded theoretically.

6. Sixth Embodiment

Figure 16:
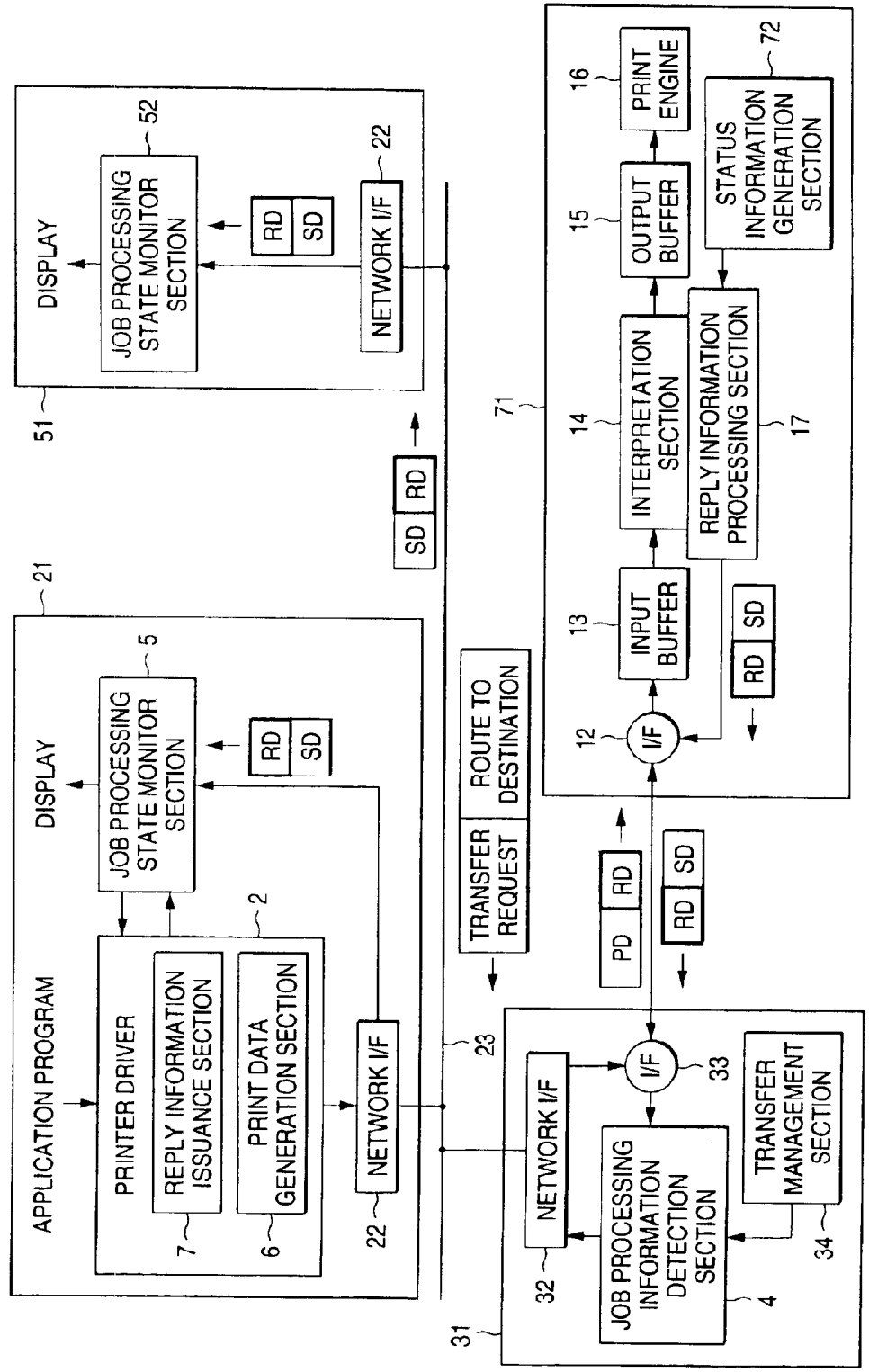
FIG. 16 is a block diagram of a print system according to a sixth embodiment of the invention.

Next, a sixth embodiment of the invention will be discussed with reference to FIGS. 16 and 17. The sixth embodiment is characterized by the fact that printer status information is contained in job processing information returned to a host computer.

A printer 71 according to the embodiment is provided with a status information generation section 72 as "status information generation means." Here, for example, the printer name, the paper remaining amount, the toner or ink remaining amount, the installed memory capacity, etc., can be named as the status information.

Figure 17:
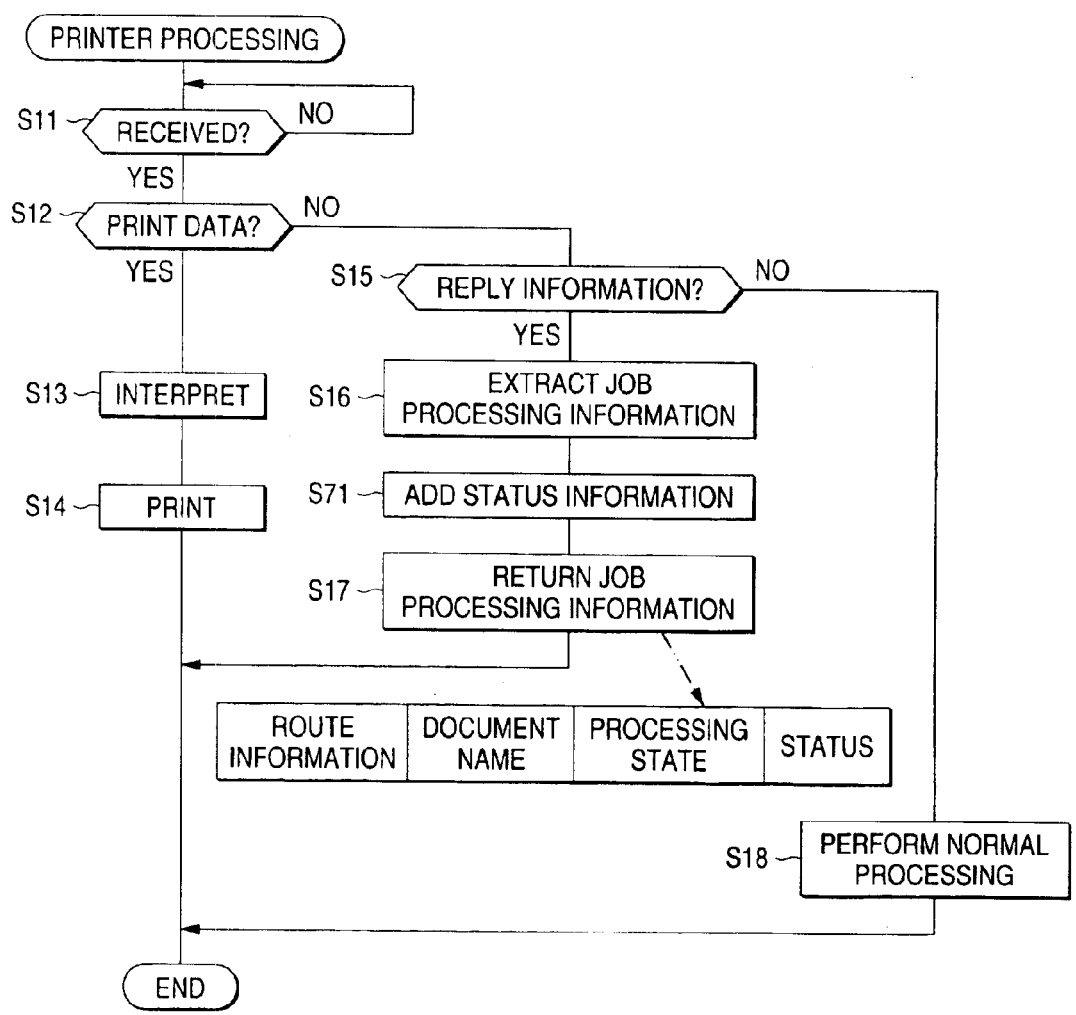
FIG. 17 is a flowchart to show printer processing in the sixth embodiment of the invention.

FIG. 17 is a flowchart to show printer processing executed by the printer 71. The processing comprises all steps of S11 to S18 shown in FIG. 5. In addition, in the embodiment, printer status information is contained in job processing information at step S71 between steps S16 and S17.

The described embodiment can also provide advantages similar to those of the first embodiment described above. In addition, in the sixth embodiment, the printer status information is contained in the job processing information, so that the user can easily keep track of the print job processing state and the printer status.

7. Seventh Embodiment

Figure 18:
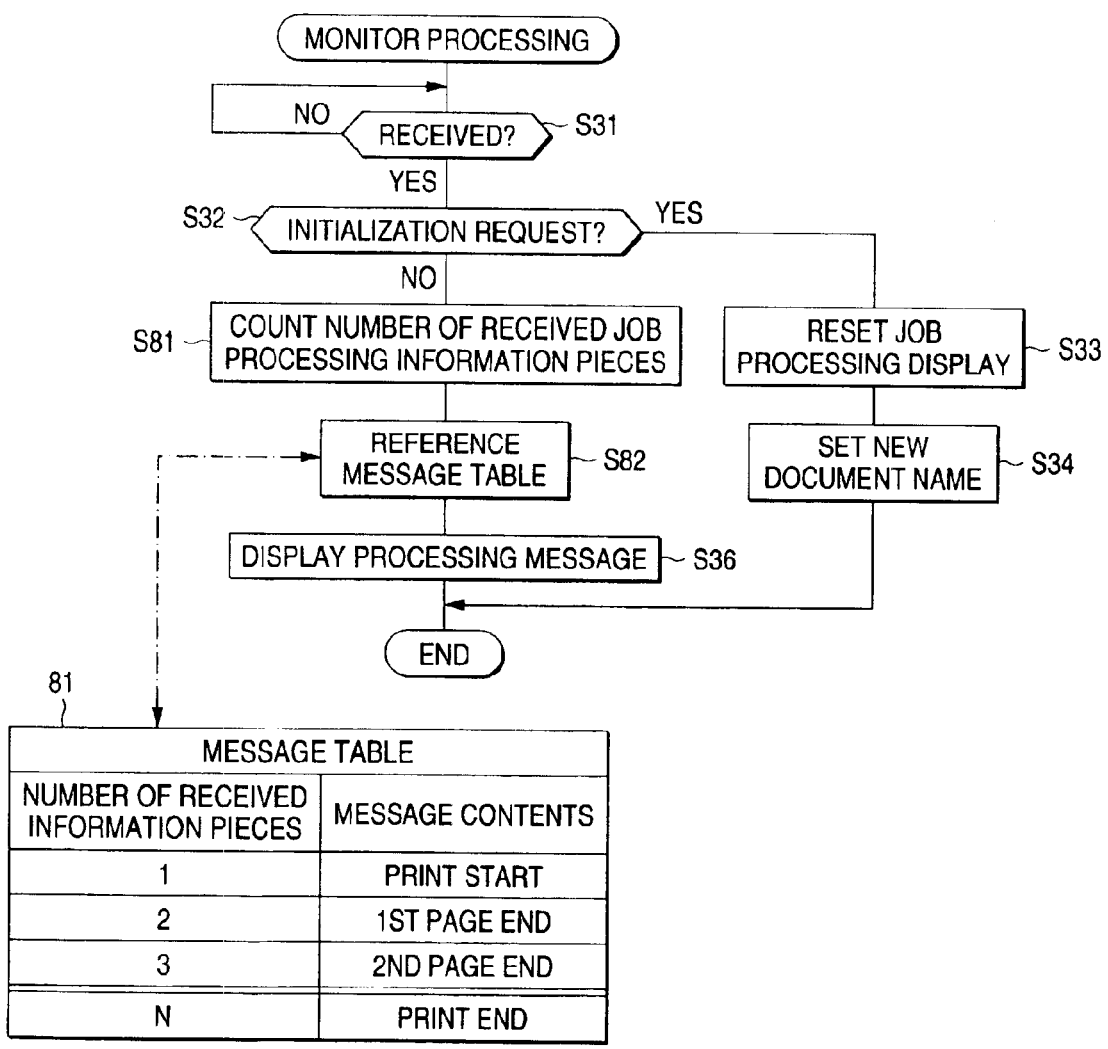
FIG. 18 is a flowchart to show monitor processing according to a seventh embodiment of the invention.

Next, a seventh embodiment of the invention will be discussed with reference to FIG. 18, which is a flowchart to show monitor processing according to the seventh embodiment. The embodiment is characterized by the fact that position information on job processing is not contained in job processing information and that the processing state is detected based on the number of received job processing information pieces.

The monitor The processing comprises steps of S31 to S34 shown in FIG. 7. In addition, in the embodiment, if NO is returned at step S32, the number of received job processing information pieces is counted at step S81 and a message table 81 is referenced based on the number of received job processing information pieces added up for each print job at step S82, whereby the processing message to be displayed is selected. The total number of pages of a document is previously sent from a printer driver 2 to a job processing state monitor section, whereby the message table 81 can be constructed for each print job.

The described embodiment can also provide advantages similar to those of the first to sixth embodiments described above. In addition, in the seventh embodiment, the job processing state, which is position information on job processing, is not contained in job processing information and the print job progress state is monitored based on the number of received job processing information pieces, so that the data amount of the job processing information can be lessened for decreasing the communication traffic.

8. Eighth Embodiment

Figure 19:
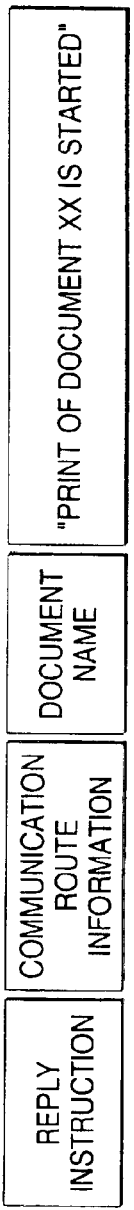
FIG. 19(a)–FIG. 19(e) are schematic representations to show the format of reply information according to an eighth embodiment of the invention.
Figure 19:
Figure 19:
Figure 19:
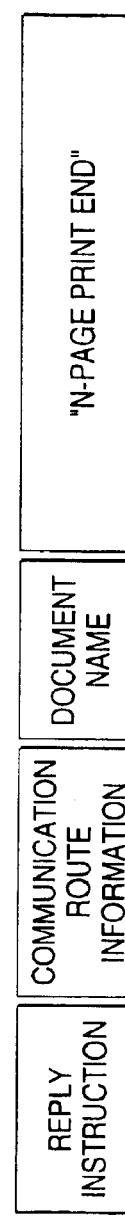
Figure 19:

Next, an eighth embodiment of the invention will be discussed with reference to FIG. 19, which is a schematic representation to show the eighth embodiment. The embodiment is characterized by the fact that a processing message to indicate the print job progress state as the job processing state is stored as character code information.

The described embodiment can also provide advantages similar to those of the first to seventh embodiments described above. In addition, in the eighth embodiment, character code information is used as the job processing state, thus a job processing state monitor section can cause the print job processing state to be displayed on a display without referencing a correspondence table, etc., storing the correspondence between compression information and processing messages.

9. Ninth Embodiment

Next, a ninth embodiment of the invention will be discussed with reference to FIGS. 20 to 28. The ninth embodiment is characterized by the fact that the return timing of reply information (job processing information) is specified.

Figure 20:
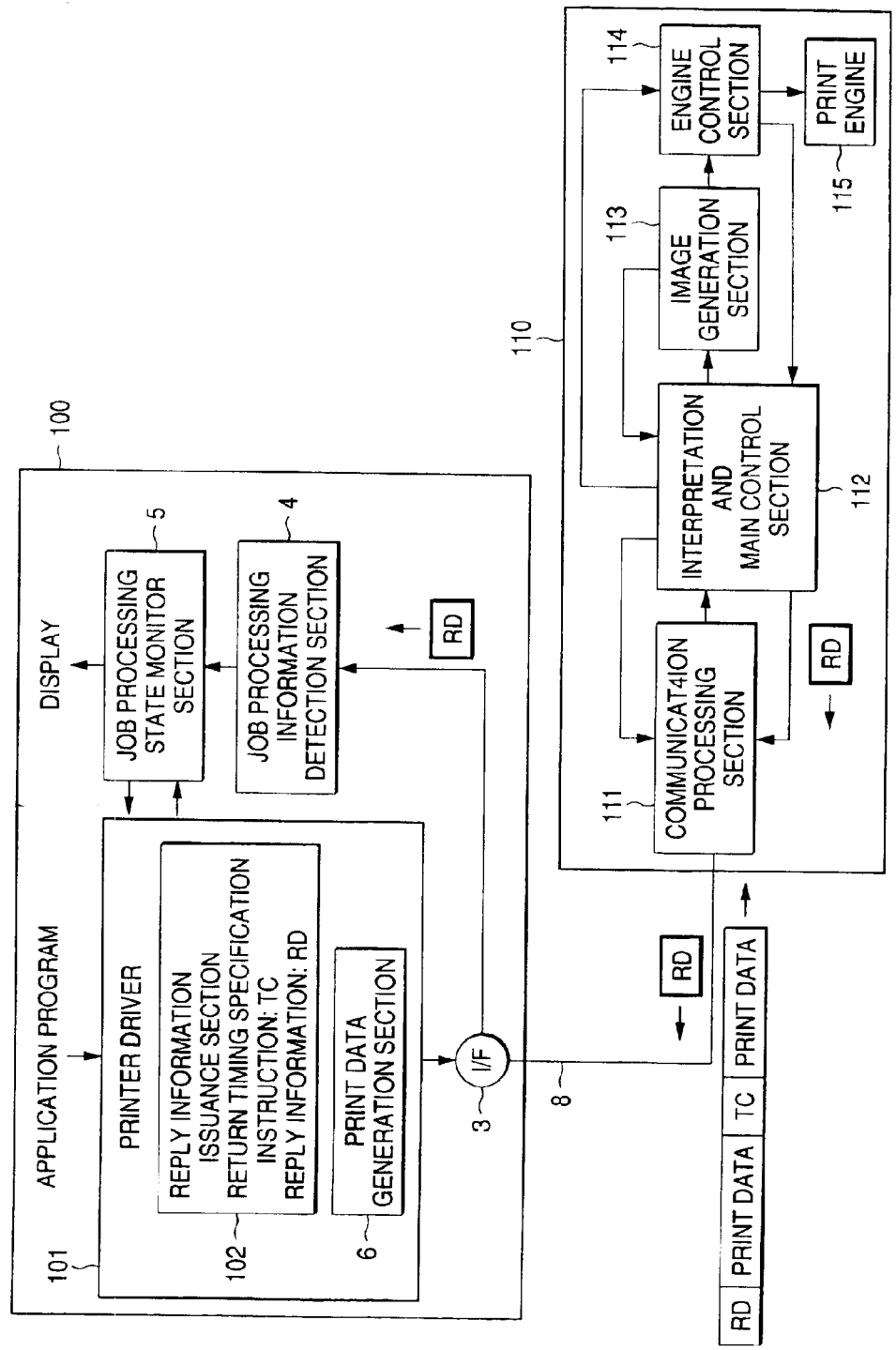
FIG. 20 is a block diagram of a print system according to a ninth embodiment of the invention.

FIG. 20 is a block diagram of a print system according to the ninth embodiment of the invention. A host computer 100 comprises a job processing information detection section 4, a job processing state monitor section 5, a print data generation section 6, etc. A reply information issuance section 102 of a printer driver 101 issues not only reply information, but also a return timing specification instruction (also represented as TC in the figures) for specifying the return timing of the reply information.

A printer 110 comprises a communication processing section 111, an interpretation and main control section 112, an image generation section 113, an engine control section 114, and a print engine 115 as described later. It is formed as a printer of a parallel processing type wherein the communication processing section 111, the interpretation and main control section 112, the image generation section 113, and the engine control section 114 can operate separately.

The communication processing section 11 also serving as "reception means" is connected to the host computer 100 via a communication line 8; etc., and executes two-way communication with the host computer 100. The interpretation and main control section 112 as "print data processing means" interprets print data (in this case, also containing print commands) and controls the reply information return timing, etc. The image generation section 113 that can be represented as "image generation means" generates image data for print based on the interpretation result of the interpretation and main control section 112 and expands the image data in an image buffer (not shown). The engine control section 114 as "print control means" reads the image data generated by the image generation section 113 and controls the operation of the print engine 115, thereby printing. For example, to form the printer 110 as a page printer, one-page image data is generated and expanded before the print engine 115 is driven. On the other hand, for example, to form the printer 110 as a page printer, one-band or multiple-band image data is generated and expanded before the print engine 115 is driven.

Figure 21:
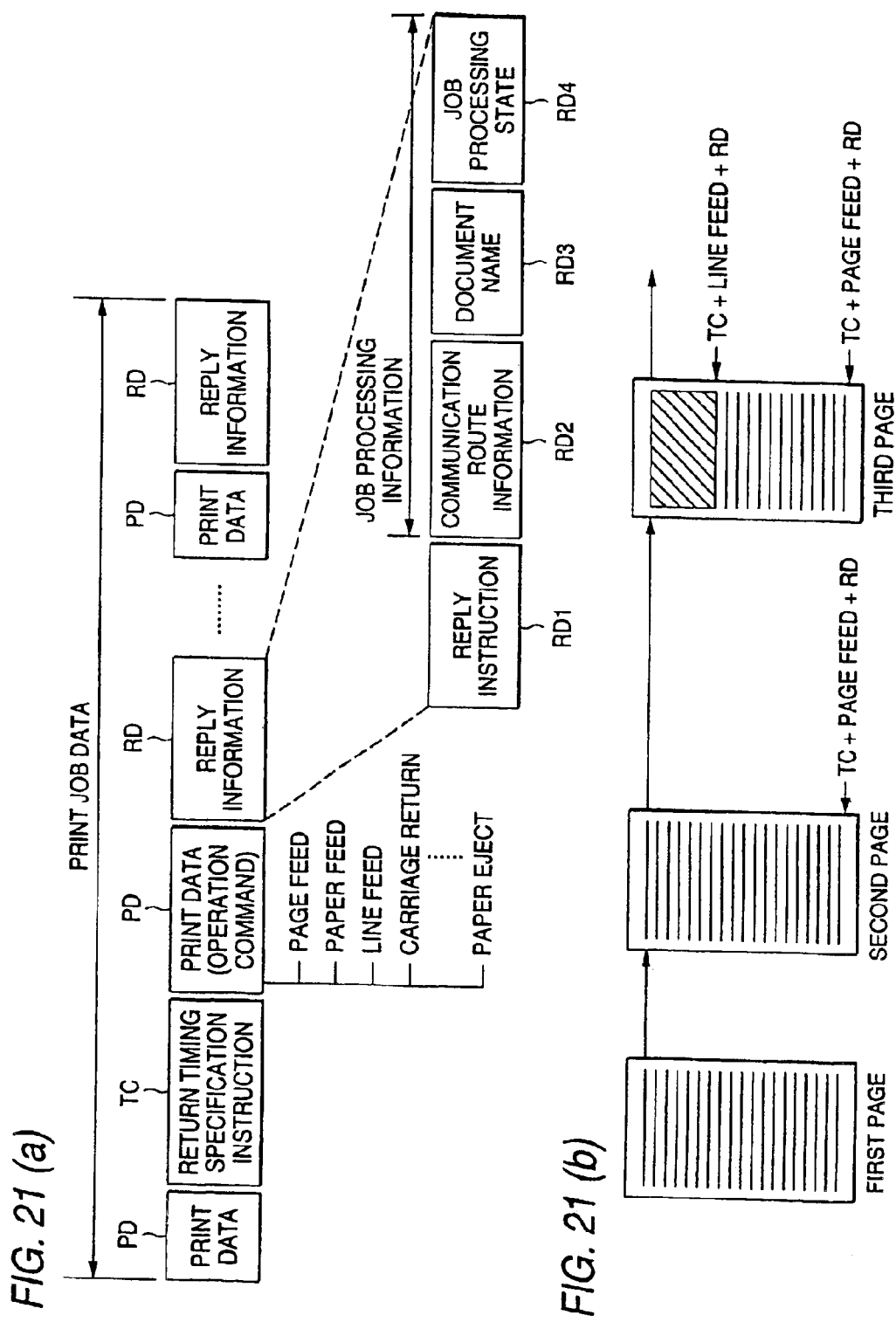
FIG. 21(a) and FIG. 21(b) are schematic representations to show the format of print job data, etc., in the ninth embodiment of the invention.
Figure 22:
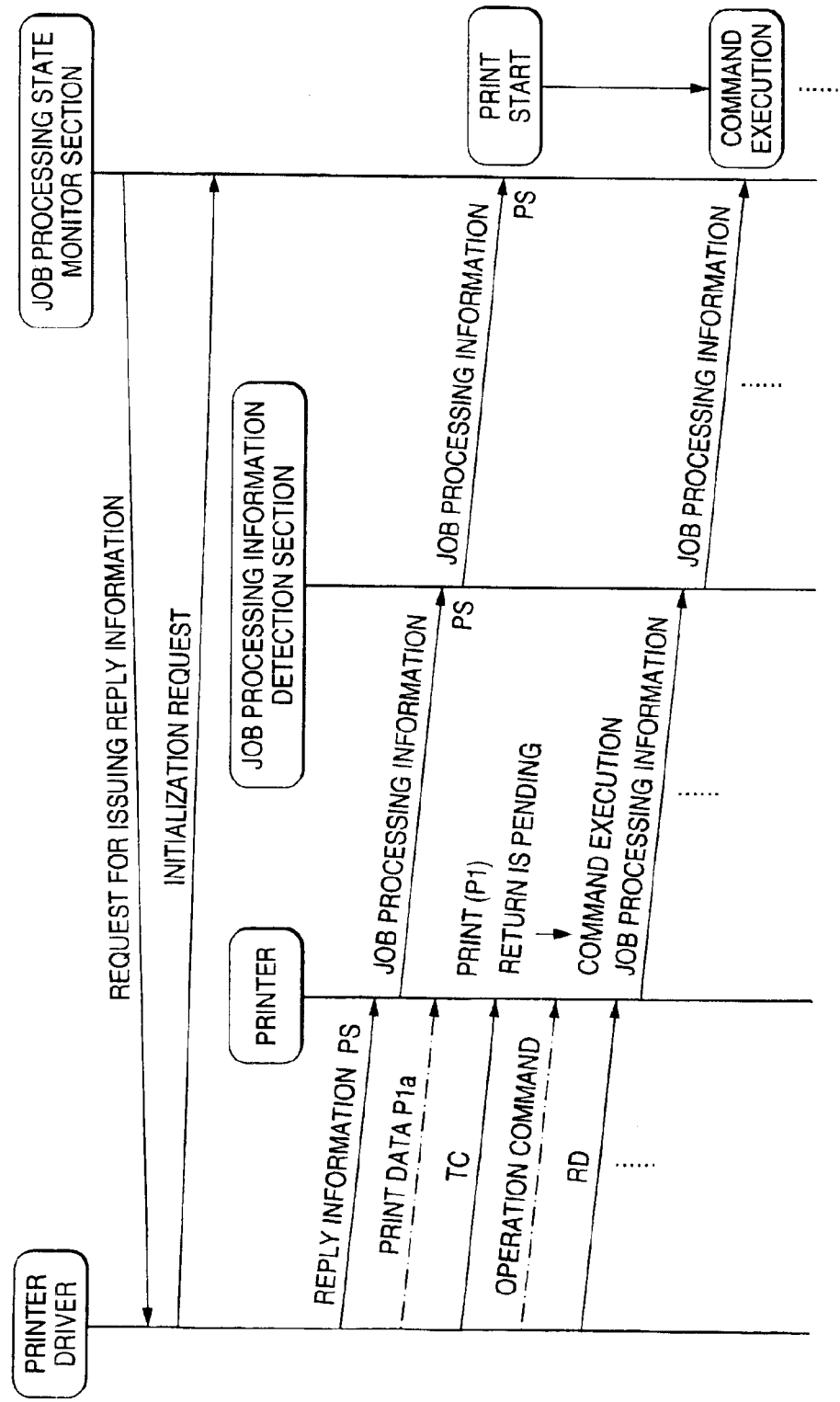
FIG. 22 is a schematic representation to show a general flow of data processing in the ninth embodiment of the invention.

Next, FIG. 21 is a schematic representation to show the format of print job data according to the embodiment. As shown in FIG. 21(a), it must be noted that the print job data contains not only print data (PD) and reply information (RD), but also a return timing specification instruction (TC). It should also be noted that the return timing specification instruction (TC) is not issued for all of the print data and is issued only for print commands of the print data concerning the print operation.

The return timing specification instruction is issued preceding a print command of the print data concerning the print operation (also referred to as operation command). For example, page feed, paper feed, line feed, carriage return, paper eject, etc., can be named as the print commands concerning the print operation. Reply information is issued following the print command. That is, their issuing positions are defined so that the interpretation and main control section 112 of the printer 110 interprets the return timing specification instruction, the print command, and the reply information in order. If the printer 110 receives the return timing specification instruction, it checks to ensure that the operation command following the return timing specification instruction is processed by the engine control section 114, then returns the reply information.

In other words, the printer 110 need not consider the processing termination of print data not immediately preceded by the return timing specification instruction and can process the received print data one after another in parallel. This means that the return timing specification instruction is issued only for specific print commands. Thus, the accuracy of the reply information return timing is maintained, the processing load is taken off the printer, and the parallel processing capability is maintained.

As shown in FIG. 21(b), a combination of the return timing specification instruction and the reply information can be inserted into any desired position in a print job. For example, the return timing specification instruction is not issued on the first page and can be issued at the page feed operation time of the second page. Alternatively, more than one return timing specification instruction can also be issued in the same page. For example, the return timing specification instruction may be issued at the line feed time just after image print and at the page feed time. It is not always necessary to issue the reply information and the return timing specification instruction in a one-to-one correspondence with each other. The presence of the reply information involving no return timing specification instruction is also allowed, or more than one reply information return timing may be specified in one return timing specification instruction. If the return timing is specified by the return timing specification instruction, the time accuracy of report with the job processing state is improved. If the time accuracy of report is not expected, the return timing specification instruction may become unnecessary.

Next, the operation of the embodiment will be discussed with reference to FIGS. 22 to 28. First, a general flow of data processing will be outlined with reference to FIG. 22. Here, a line feed command is transmitted following one-band print data (P1a) and job processing information is returned upon completion of processing the line feed command as an example.

The printer driver 101 issues reply information before transmission of the one-band print data P1a. The first reply information is provided for indicating the print start. It is detected in the printer 110, is sent to the job processing information detection section 4, and is passed through the job processing information detection section 4 to the job processing state monitor section 5 as previously described with reference to FIG. 3.

Next, the printer driver 101 transmits the first one-band print data P1a. The printer 110 interprets the print data P1a and requests the image generation section 113 to perform image processing. While the image generation section 113 expands a print image, the printer 110 receives a return timing specification instruction TC, an operation command (line feed instruction), and reply information RD one after another. The interpretation and main control section 112 of the printer 110 interprets the return timing specification instruction TC, the operation command, and the reply information RD. If the interpretation and main control section 112 completes interpretation of the reply information RD, it does not immediately request the communication processing section 111 to return the job processing information. After checking that processing of the operation command inserted between the return timing specification instruction TC and the reply information RD is complete, the interpretation and main control section 112 requests the communication processing section 111 to return the job processing information. In other words, if the return timing specification instruction TC is not received, the interpretation and main control section 112 can request the communication processing section 111 to return the job processing information without checking for processing of the print data received before reception of the reply information RD. The returned job processing information is passed through the job processing information detection section 4 to the job processing state monitor section 5 and the user is notified of the processing state through a user interface of the host computer 100.

Figure 23:
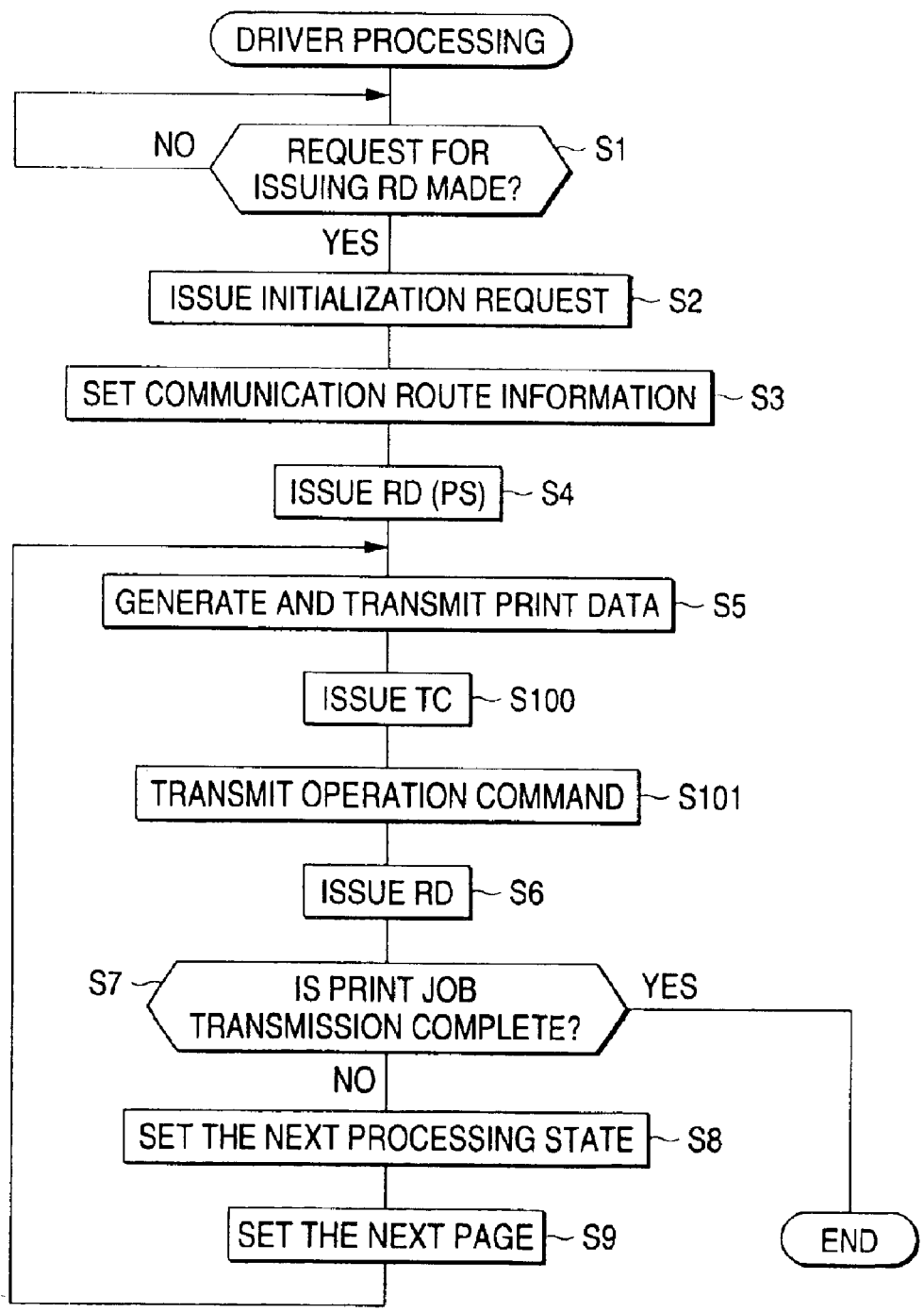
FIG. 23 is a flowchart to show driver processing in the ninth embodiment of the invention.

FIG. 23 is a flowchart to show driver processing according to the embodiment. The driver processing comprises all steps of S1 to S9 shown in FIG. 4. In addition, in the processing, a new step is added between steps S5 and S6. That is, after print data is transmitted at step S5, a return timing specification instruction TC is issued at step S100, then an operation command of line feed, page feed, etc., is transmitted at step S101. Following the operation command, reply information RD is transmitted at step S6. It should be noted that the return timing specification instruction TC and reply information are not set for print data other than the operation command. Return of reply information is specified for the operation commands of line feed, page feed, etc.

Figure 24:
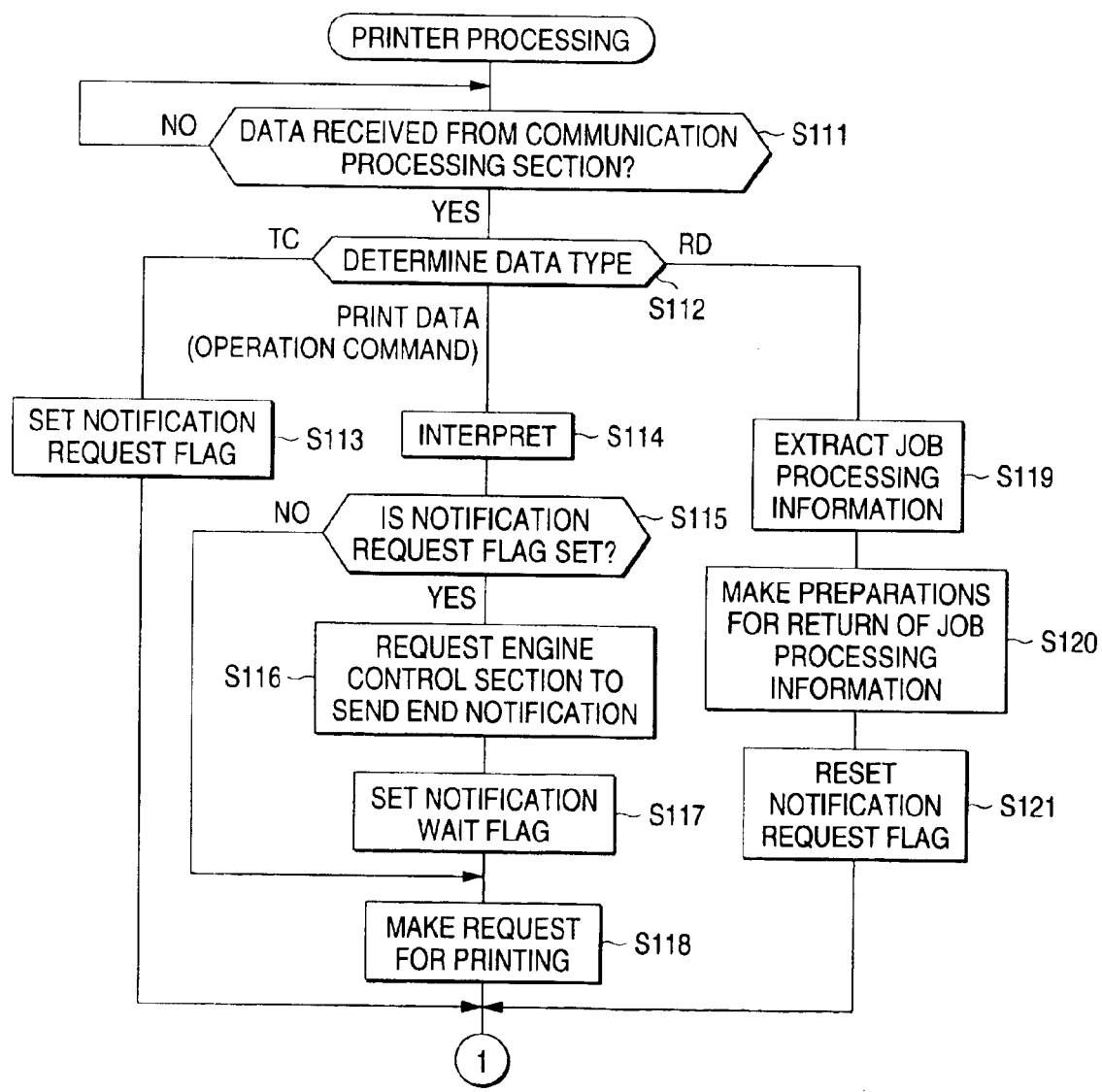
FIG. 24 is a flowchart to show printer processing in the ninth embodiment of the invention.
Figure 25:
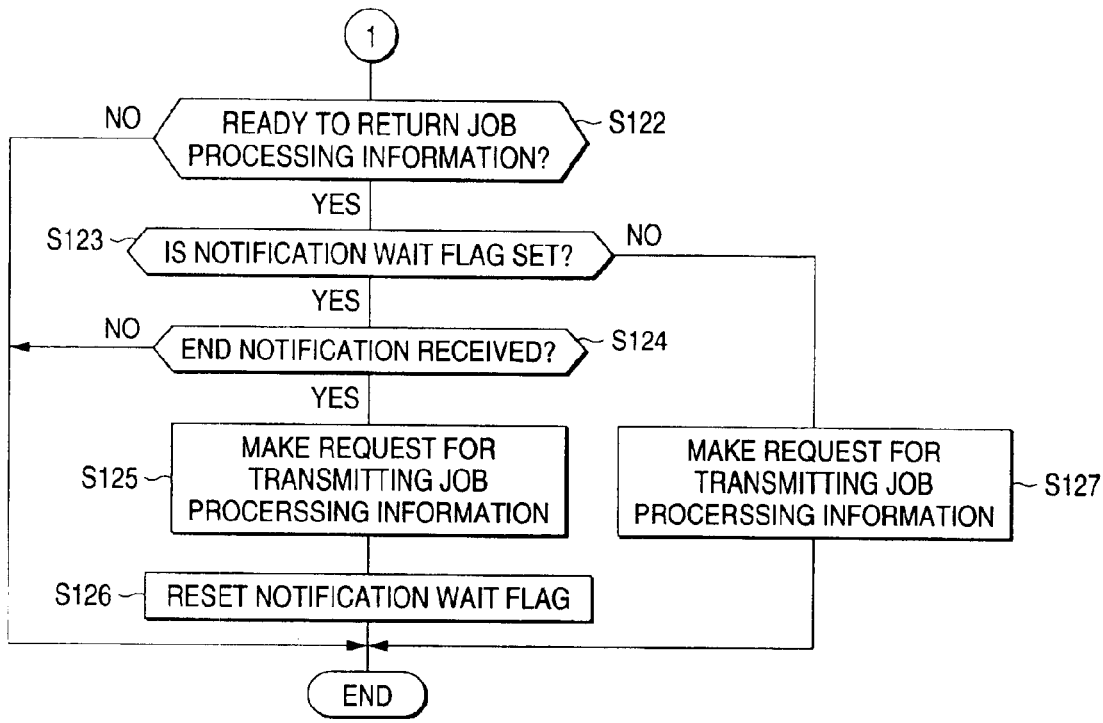
FIG. 25 is a flowchart following FIG. 24 in the ninth embodiment of the invention.

Next, FIGS. 24 and 25 are flowcharts to show printer processing, more precisely, processing of the interpretation and main control section 112 according to the embodiment.

The interpretation and main control section 112 checks whether or not data is received from the communication processing section 111 at step S111. If data is received, the interpretation and main control section 112 determines what type the data is of at step S112. That is, it determines which of print data (containing an operation command), a return timing specification instruction, and reply information the input data from the communication processing section 111 corresponds to. For convenience of the description, the step related to "normal processing" previously described with reference to FIG. 5 is omitted in FIG. 24.

If the received data is a return timing specification instruction, the interpretation and main control section 112 sets a notification request flag at step S113. The notification request flag is used to request the engine control section 114 to send an end notification upon completion of print execution.

If the received data is print data, the interpretation and main control section 112 interprets the print data at step S114 and determines whether or not the notification request flag is set at step S115. If the notification request flag is set, the interpretation and main control section 112 requests the engine control section 114 to send an end notification at step S116 and sets a notification wait flag at step S117. The notification wait flag is used to wait for an end notification from the engine control section 114 and return job processing information. The interpretation and main control section 112 passes the interpretation result of the print data to the image preparation section 113, etc., and makes a request for printing at step S118. If the notification request flag is not set (NO at step S115), the interpretation and main control section 112 skips steps S116 and S117 and goes to step S118.

If the received data is reply information, the interpretation and main control section 112 extracts job processing information at step S119 and makes preparations for return of the job processing information at step S120. It should be noted that the job processing information is not immediately returned. At step S121, the interpretation and main control section 112 resets the notification request flag set at step S113.

Referring to FIG. 25, after making a request for printing at step S118, the interpretation and main control section 112 determines whether or not return of the job processing information is ready at step S122. If return of the job processing information is not ready (NO at step S122), the interpretation and main control section 112 terminates the processing. If return of the job processing information is ready, then the interpretation and main control section 112 determines whether or not the notification wait flag is set at step S123. If the notification wait flag is set (YES at step S123), it means that the engine control section 114 is requested to send an end notification. Then, the interpretation and main control section 112 waits for an end notification from the engine control section 114 at step S124. Upon reception of an end notification, the interpretation and main control section 112 requests the communication processing section 111 to return the job processing information at step S125, and resets the notification wait flag at step S126. On the other hand, if the interpretation and main control section 112 determines that the notification wait flag is not set (NO at step S123), it requests the communication processing section 111 to return the job processing information at step S127 without waiting for an end notification from the engine control section 114.

According to the processing shown in FIGS. 24 and 25, it is not necessary for the interpretation and main control section 112 to monitor print data for which a return timing specification instruction is not set until processing of the print data is complete, and the interpretation and main control section 112 needs only to interpret the print data and make a request for printing the print data. If reply information not associated with a return timing specification instruction is received, the interpretation and main control section 112 can also make a request for returning job processing information without checking the print data received immediately before reception of the reply information for completion of processing. Only if a return timing specification instruction is received, the interpretation and main control section 112 checks that processing of the print data (operation command) received following the return timing specification instruction is complete, then makes a request for returning job processing information.

Figure 26:
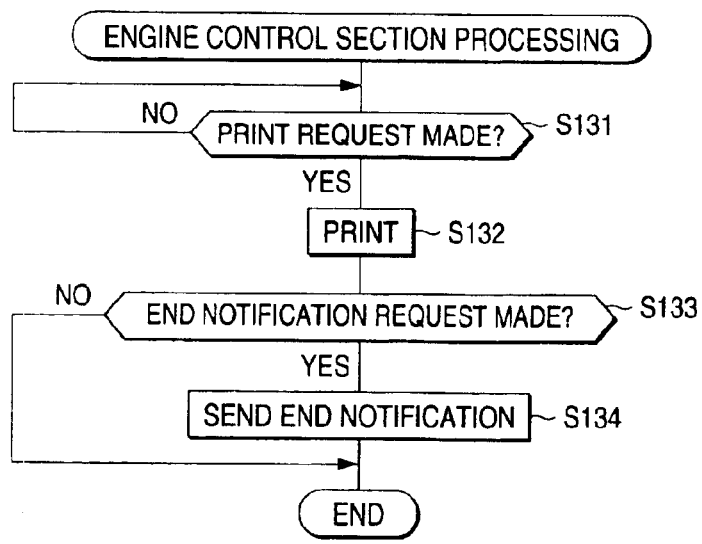
FIG. 26 is a flowchart to show processing of an engine control section in the ninth embodiment of the invention.

FIG. 26 is a flowchart to show processing of the engine control section 114. Upon reception of a print request at step S131, the engine control section 114 is started and executes requested processing at step S132. For example, if the engine control section 114 is requested to execute one-band print, it performs horizontal scanning and executes one-band print. For example, if a line feed request is made, the engine control section 114 feeds one line of paper and executes a carriage return. Next, the engine control section 114 determines whether or not it is requested to send an end notification at the processing completion time at step S133. If the engine control section 114 is requested to send an end notification, it sends a requested processing end notification to the interpretation and main control section 112 at step S134.

Figure 27:
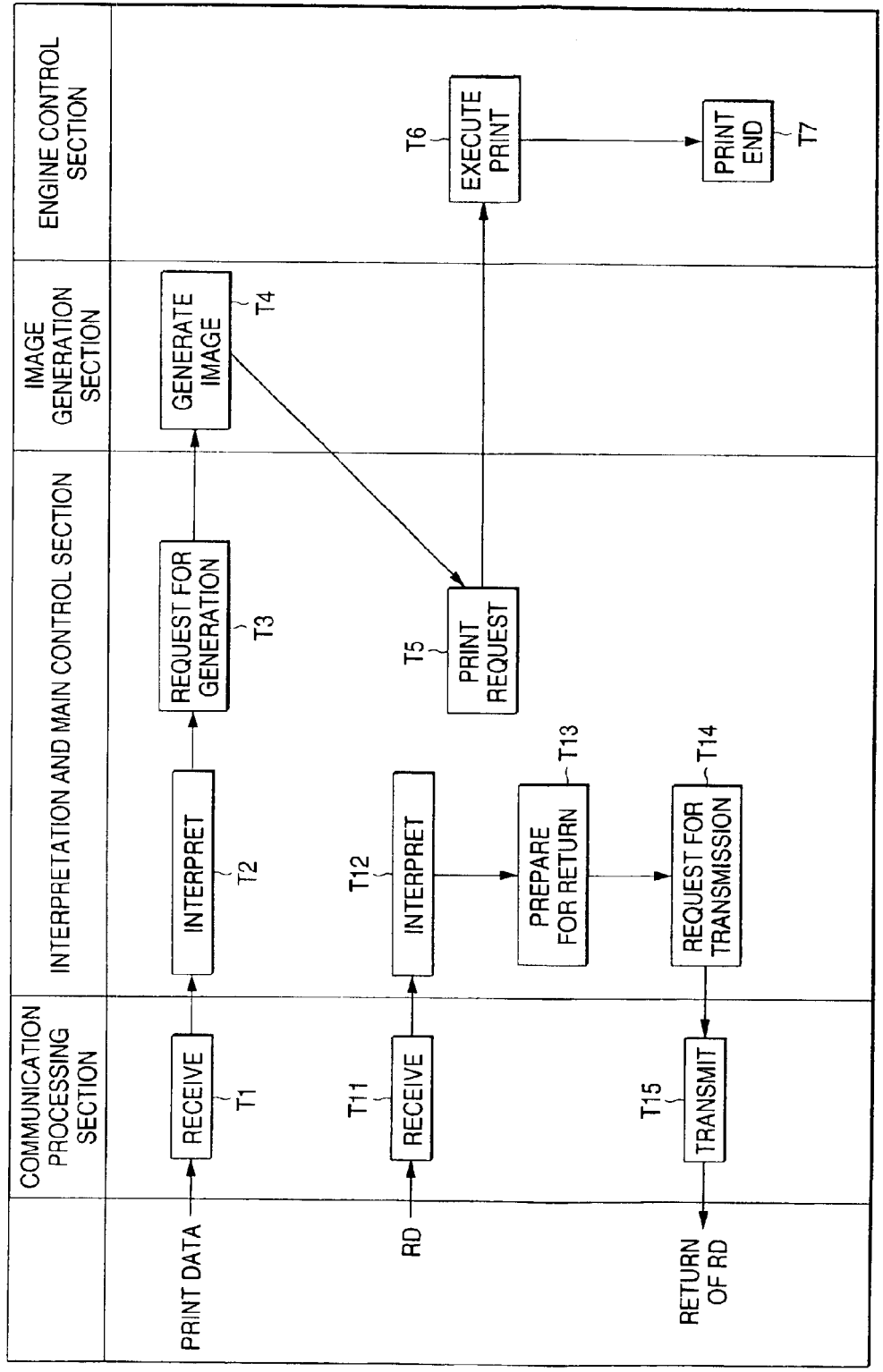
FIG. 27 is a schematic representation to show a data processing flow in a printer in the ninth embodiment of the invention.

Next, a flow of data processing will be discussed with reference to FIGS. 27 and 28. FIG. 27 is a schematic representation to show processing, etc., performed when reply information not associated with a return timing specification instruction is received.

First, print data transmitted from the host computer 100 is received by the communication processing section 111 at time T1. The interpretation and main control section 112 interprets the print data passed from the communication processing section 111 at time T2 and requests the image generation section 113 to generate and expand image data for print at time T3. When the image generation section 113 generates and expands image data for print at time T4, the interpretation and main control section 112 requests the engine control section 114 to print at time T5. Then, the engine control section 114 executes print at time T6 and ends the print at time T7.

When reply information (RD) following the print data is transmitted from the host computer 100, it is received by the communication processing section 111 at time T1 and is interpreted by the interpretation and main control section 112 at T12. The interpretation and main control section 112 extracts job processing information and makes preparations for return of the job processing information at time T13 and requests the communication processing section 111 to return the job processing information at time T14. Upon reception of the request, the communication processing section 111 returns the job processing information at time T15.

Figure 28:
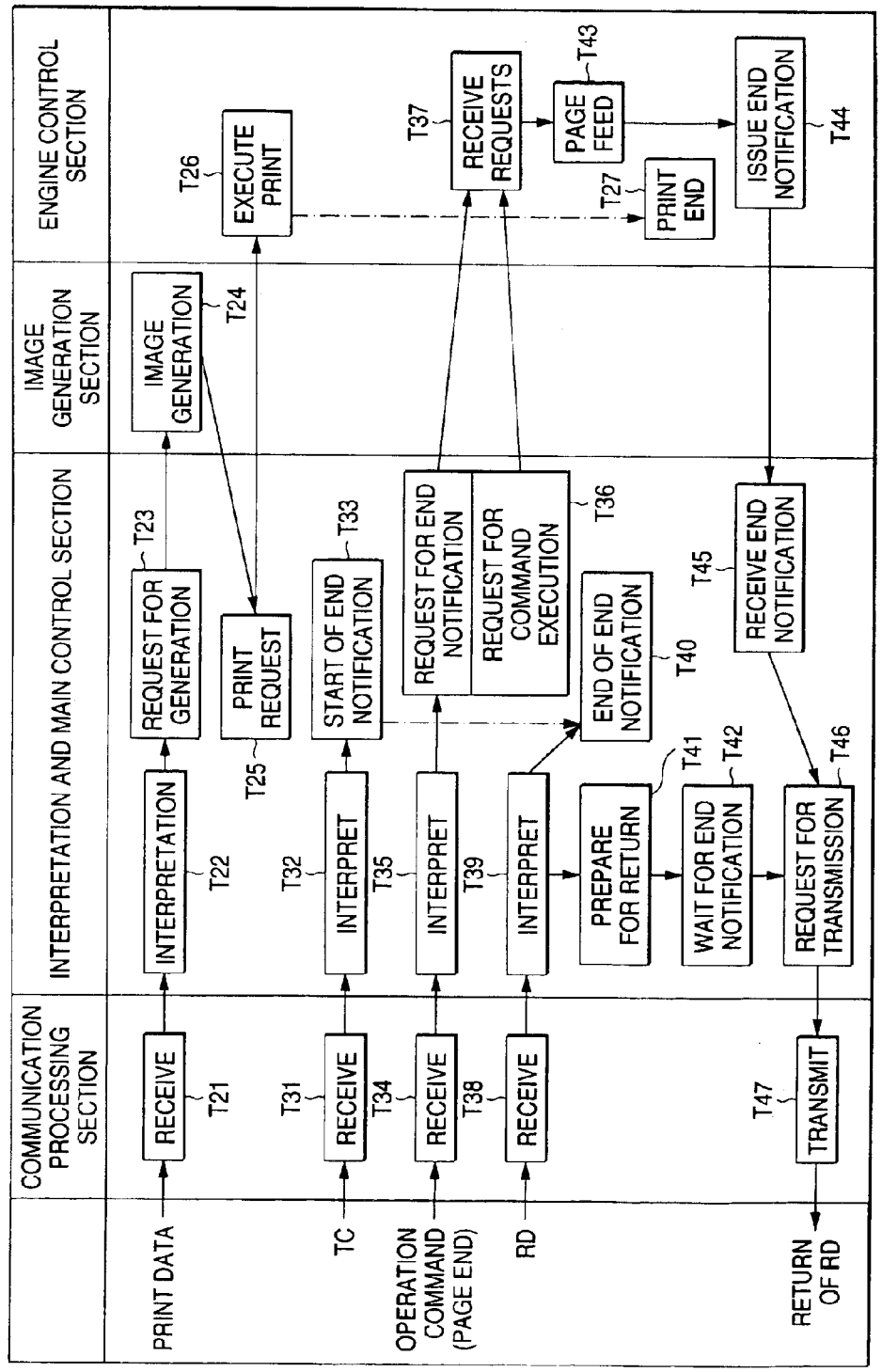
FIG. 28 is a schematic representation to show a data processing flow in the printer like FIG. 27 in the ninth embodiment of the invention.

FIG. 28 is a schematic representation to show a processing flow applied when a return timing specification instruction is set for a page feed command.

First, print data is received by the communication processing section 111 at time T21 and is interpreted by the interpretation and main control section 112 at time T22. The interpretation and main control section 112 requests the image generation section 113 to generate image data at time T23. When the image generation section 113 generates image data at time T24, the interpretation and main control section 112 requests the engine control section 114 to print at time T25. Then, the engine control section 114 starts print at time T26. The print ends at time T27 in a predetermined time.

When the print is being executed, a return timing specification instruction (TC) is received by the communication processing section 111 at time T31 and is interpreted by the interpretation and main control section 112 at T32. The interpretation and main control section 112 sets the notification request flag and starts an end notification request at time T33.

When an operation command is received at time T34 following the return timing specification instruction, the interpretation and main control section 112 interprets the operation command at time T35 and requests the engine control section 114 to execute the operation command and to send an end notification at completion of processing the operation command at time T36. This request is accepted by the engine control section 114 at time T37.

When reply information is received at time T38 following the operation command, the interpretation and main control section 112 interprets the reply information at time T39, resets the notification request flag, and ends the end notification request at time T40. The interpretation and main control section 112 makes preparations centering on job processing information from the reply information at time T41 and waits for an end notification from the engine control section 114.

On the other hand, the engine control section 114, which is executing the print requested at time T26, executes a page feed at a predetermined position at time T43 and ends the print at time T27. It notifies the interpretation and main control section 112 that execution of the page feed command ends at time T44.

Upon reception of the end notification from the engine control section 114 at time T45, the interpretation and main control section 112 requests the communication processing section 111 to return the job processing information at time T46. Upon reception of the request, the communication processing section 111 returns the job processing information at time T47.

The described embodiment can also provide advantages similar to those of the first embodiment described above. In addition, it provides the following advantages:

First, after a check is made to ensure that the operation of an operation command is complete, job processing information is returned, thus it is not necessary to check print data other than the operation command for processing completion and the print job progress state can be precisely managed without reducing the processing speed of parallel processing.

That is, there is a possibility that the job processing information return timing may not match the actual data processing under the parallel control under which the communication processing section 111, the interpretation and main control section 112, the image generation section 113, and the engine control section 114 can operate separately, because upon reception of reply information, the interpretation and main control section 112 can make a request for returning job processing information without checking for processing of the print data received before reception of the reply information. For example, as shown in FIG. 27, while the print data received before reception of the reply information is printed, the interpretation and main control section 112 can extract job processing information and make a request for returning the job processing information. It does not consider the processing state in the engine control section 114. Therefore, the actual processing state of print data does not match the job processing information return timing.

As a technique for solving this problem, a method of making the interpretation and main control section 112 monitor the processing state of all print data is also possible. That is, a request for returning the job processing information is not made until a notification indicating processing completion of all print data received before reception of the reply information is sent from the engine control section 114. According to this method, the reliability of notifying the job processing state based on the job processing information can be enhanced. However, to make the interpretation and main control section 112 monitor the processing state of all print data received before reception of the reply information, the monitor load on the interpretation and main control section 112 grows and a sufficient memory resource for monitoring the processing state is required. There is a possibility that the interpretation and main control section 112 may be unable to interpret new data until print data processing is complete; the advantage of parallel processing is impaired and the print processing speed is reduced.

In contrast, in the embodiment, only if reply information is associated with an operation command, a check is made for processing of the operation command before job processing information is returned. Thus, the processing speed can be prevented from reducing while the reliability of notifying the job processing state based on the job processing information is maintained.

Second, the operation command whose processing completion is to be checked is explicitly specified by a return timing specification instruction, so that the interpretation and main control section 112 can easily discriminate the operation command whose processing completion from others and the processing structure can be simplified.

Third, a return timing specification instruction, a print command, and reply information are issued so that they are processed in this order, thus the job processing information notification accuracy can be enhanced while the processing structure can be simplified. That is, upon reception of a return timing specification instruction, the interpretation and main control section 112 can make preparations for an end notification request and upon reception of a print command, can request the engine control section 114 to send an end notification concerning the operation command. In the processing, the interpretation and main control section 112 need not retain any operation command before reception of reply information and need not cancel an end notification request for the engine control section 114 either.

If the return timing specification instruction is not adopted or is issued following reply information (namely, in the order of operation command, reply information, and return timing specification instruction), the interpretation and main control section 112 cannot previously sense what print data for which end check is requested. Therefore, the interpretation and main control section 112 needs to use a ring buffer, etc., to retain at least one most recent print data piece. Further, if the interpretation and main control section 112 cannot use a sufficient memory resource, processing of previously making an end notification request for each piece of the print data passed to the engine control section 114 and canceling an unnecessary end notification request when reply information is received can also become necessary. In contrast, in the embodiment, a return timing specification instruction is previously transmitted, whereby the operation command requiring an end notification can be specified clearly and the processing structure is simplified. The scope of the invention also contains the configuration in which one or more most recent print data pieces are retained in the interpretation and main control section 112.

10. Tenth Embodiment

Figure 29:
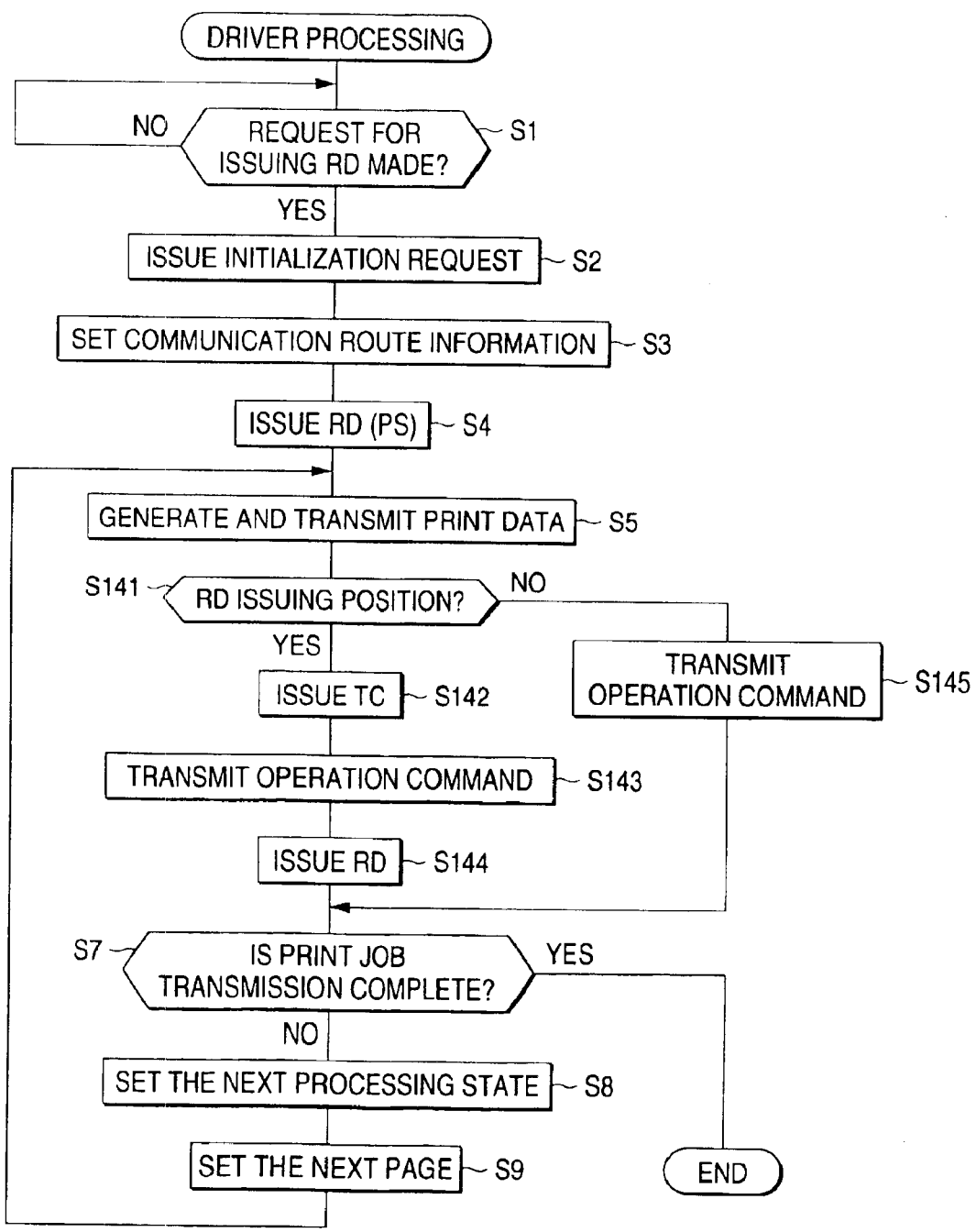
FIG. 29 is a flowchart to show driver processing according to a tenth embodiment of the invention.

Next, a tenth embodiment of the invention will be discussed with reference to FIG. 29, which is a schematic representation to show driver processing according to the tenth embodiment. Like the fifth embodiment described above, the tenth embodiment is characterized by the fact that the issuing positions of a return timing specification instruction and reply information are set in response to the attribute of a document.

That is, whether or not the position is the reply information issuing position is determined in response to the document attribute at step S141. If the position is the reply information issuing position, first a return timing specification instruction is issued at step S142, next an operation command is transmitted at step S143, and last reply information is issued at step S144. On the other hand, if the position is not the reply information issuing position, only an operation command is transmitted at step S145 without issuing a return timing specification instruction or an operation command. The step for transmitting document attribute information in FIG. 14 is omitted.

11. Eleventh Embodiment

Figure 30:
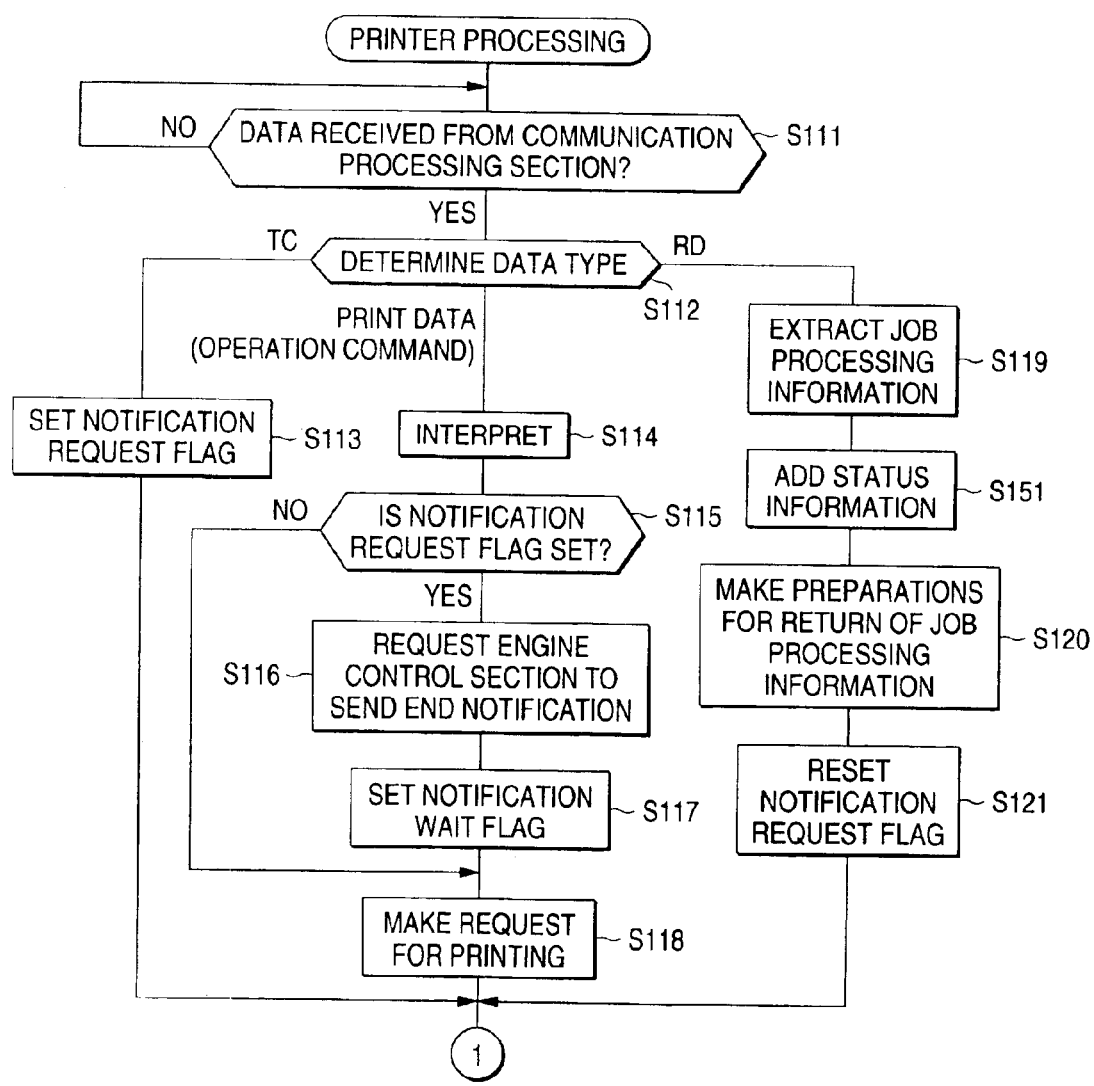
FIG. 30 is a flowchart to show printer processing according to an eleventh embodiment of the invention.

FIG. 30 is a flowchart of printer processing according to an eleventh embodiment of the invention. Like the sixth embodiment, the eleventh embodiment is characterized by the fact that status information of a printer 110 is added to job processing information at step S151 for transmission.

It is further understood by those skilled in the art that various changes and modifications may be made in the invention without departing from the spirit and scope thereof. For example, as shown in FIG. 1, a program, etc., for embodying the invention is recorded on a recording medium MM and the record contents are loaded into the host computer or the printer, whereby the invention can be embodied.

Any other embodiment contained in the scope of the invention can also be provided by combining some of the above-described embodiments. For example, the return timing specification instruction can also be applied to the embodiment in which the processing messages are converted into character code, the embodiment in which the job processing information is sent to more than one host computer, and the like.

Further, for example, the invention can also be represented as a print method or a print data generation system as follows:

Representation 1. A print method for printing while monitoring the processing state, the method comprising a first step of generating print data, a second step of issuing reply information at a predetermined position of print job data containing the print data, a third step of detecting the reply information from the print job data, a fourth step of returning the detected reply information to a predetermined destination, a fifth step of printing based on the print data in the print job data, and a sixth step of monitoring the processing state of the print job data based on the returned reply information.

Representation 2. The print method as described in representation 1 wherein the fourth step returns the reply information to the predetermined destination after checking processing of the print data.

Representation 3. The print method as described in representation 1 wherein the second step further issues timing specification information for specifying the return timing of the reply information and wherein the fourth step returns the reply information to the predetermined destination at the return timing specified on the timing specification information.

Representation 4. The print method as described in any of representations 1 to 3 wherein the second step issues the reply information for each page of the print job data.

Representation 5. The print method as described in any of representations 1 to 3 wherein the second step issues the reply information corresponding to one or more pages of the print job data based on the document attributes relevant to the print job data.

Representation 6. A print data generation system for generating print data for a printer to print, the print data generation system comprising print data generation means for generating print data based on an input document, reply information issuance means for issuing reply information at a predetermined position of print job data containing the print data, and transmission means for transmitting the print job data to the printer.

Representation 7. The print data generation system as described in representation 6 wherein the reply information issuance means issues timing specification information for specifying the return timing of the reply information in addition to the reply information.

Representation 8. The print data generation system as described in representation 7 wherein the reply information issuance means issues the reply information and the timing specification information so that the print data is placed between the reply information and the timing specification information.

Representation 9. The print data generation system as described in representation 8 wherein the reply information issuance means issues the timing specification information and the reply information so that the timing specification information, the print data, and the reply information are processed by the print data processing means in this order.

Representation 10. The print data generation system as described in any of representations 6 to 9 further including job processing state monitor means for monitoring the processing state of the print job data based on the reply information returned from the printer.

Representation 11. The print data generation system as described in representation 10 further including reply information detection means for detecting the reply information returned from the printer and sending the detected reply information to the job processing state monitor means.

Representation 12. The print data generation system as described in any of representations 6 to 11 wherein the reply information contains job processing information for indicating the processing state of print job data and a reply instruction for instructing the job processing information to be returned.

Representation 13. The print data generation system as described in representation 12 wherein the job processing information contains communication route information to the predetermined destination.

Representation 14. The print data generation system as described in representation 13 wherein the job processing information further contains processing position information of print job data.

Representation 15. The print data generation system as described in representation 14 wherein the processing position information is provided as character code information.

Representation 16. The print data generation system as described in representation 15 wherein the job processing information further contains document information relevant to the print job data.

Representation 17. The print data generation system as described in any of representations 12 to 16 wherein the reply information is issued for each print page of the print job data.

Representation 18. The print data generation system as described in any of representations 12 to 16 wherein the reply information is issued corresponding to one or more pages of the print job data based on the document attributes relevant to the print job data.

As described above, according to the print system, the printer, the print method, and the print data generation system according to the invention, the reply information is issued at the predetermined position of the print job data and the print job progress state can be monitored easily and precisely based on the reply information returned from the printer. Therefore, a flexible print job monitor system can be constructed at low costs without providing a dedicated print server, etc.

Since the reply information issuing position is changed based on the attributes of a document, the print job progress can be monitored in response to the various attributes such as the total number of pages and print color of the document.

Further, the processing position information of the job processing state is provided as character code information, the print job progress state can be displayed on a display, etc., simply by extracting the character code information from the returned job processing information.

Since the print data whose processing completion is to be checked is explicitly specified by a reply timing specification instruction, the reliability of notification based on the job processing information can be provided without reducing the processing speed.

What is claimed is:

1. A printer system including a host computer and a printer for receiving print data from the host computer, the printer system comprising:

print data generating means, contained in the host computer, for generating print data;

reply information issuance means for generating print job data, wherein the print job data comprises the print data and reply information, and wherein the reply information issuance means generates the print job data by locating the reply information at a predetermined position with respect to the print data, and wherein the print job data is transmitted to the printer;

print job data processing means, contained in the printer, for interpreting the print job data, detecting the reply information from the print job data, and returning a part of the print job data, which indicates a process state of the print job data based on the reply information to a predetermined destination which is external to the printer, wherein said predetermined destination is included in intrinsic data of said reply information;

print control means for printing based on interpretation of said print job data processing means; and job processing state monitor means for monitoring a processing state of the print data based on the reply information returned from said print job data processing means.

2. The print system as claimed in claim 1 wherein said print job data processing means returns the reply information to the predetermined destination after completion of processing of the print data.

3. The print system as claimed in claim 1 wherein if the reply information is related to print data concerning a print operation, said print job data processing means checks execution of the print data concerning the print operation before returning the reply information to the predetermined destination.

4. The print system as claimed in claim 1 wherein said reply information issuance means issues timing specification information for specifying return timing of the reply information in addition to the reply information, and wherein said print job data processing means returns the reply information to the predetermined destination at the return timing specified in the timing specification information.

5. The print system as claimed in claim 1 wherein said reply information issuance means issues timing specification information for specifying return timing of the reply information in addition to the reply information, and wherein upon reception of the timing specification information, said print job data processing means returns the reply information to the predetermined destination after completion of processing the print data related to the reply information.

6. The print system as claimed in claim 1 wherein said reply information issuance means issues timing specification information for specifying return timing of the reply information in addition to the reply information, and wherein upon reception of the timing specification information, said print job data processing means returns the reply information to the predetermined destination after checking processing of the print data concerning a print operation related to the reply information.

7. The print system as claimed in any of claims 4 to 6 wherein said reply information issuance means issues the reply information and the timing specification information so that the print data is placed between the reply information and the timing specification information.

8. The print system as claimed in claim 7 wherein said reply information issuance means issues the timing specification information and the reply information so that the timing specification information, the print data and the reply information are processed by said print job data processing means in this order.

9. The print system as claimed in claim 6 wherein the print data concerning print operation is at least any one of a paper feed instruction, a paper eject instruction, a page feed instruction, a line feed instruction, and a carriage return instruction.

10. The print system as claimed in any of claims 6 or 8–9 further including reply information detection means for detecting the reply information returned from said print data processing means and sending the detected reply information to said job processing state monitor means.

11. A printer for printing based on input data comprising:

reception means for receiving print job data containing reply information and print data;

print job data processing means for interpreting the print job data, detecting the reply information from the print job data, and returning a part of the print job data, which indicates a process state of the print job data based on the reply information to a predetermined destination which is external to the printer;

wherein said predetermined destination is included in intrinsic data of said reply information; and print control means for printing based on interpretation of said print job data processing means.

12. The Printer as claimed in claim 11 wherein said print job data processing means returns the reply information to the predetermined destination after said printer control means completes processing of the print data.

13. The printer as claimed in claim 11 wherein if the reply information is related to print data concerning a print operation, said print job data processing means checks that the print data concerning the print operation is executed by said print control means before returning the reply information to the predetermined destination.

14. The printer as claimed in claim 13 wherein the print data concerning the print operation is related to at least any one of a paper feed instruction, a paper eject instruction, a page feed instruction, a line feed instruction, and a carriage return instruction.

15. The printer as claimed in claim 11 wherein the print job data further contains timing specification information for specifying return timing of the reply information, and wherein said print job data processing means returns the reply information to the predetermined destination at the return timing specified in the timing specification information.

16. The printer as claimed in claim 11 wherein the print job data further contains timing specification information for specifying return timing of the reply information, and wherein upon reception of the timing specification information, said print job data processing means returns the reply information to the predetermined destination after said print control means completes processing of the print data related to the reply information.

17. The printer as claimed in claim 15 or 16 wherein the print job data is formatted so that the print data is placed between the reply information and the timing specification information.

18. The printer as claimed in claim 17 wherein the print job data is formatted so that the timing specification information, the print data, and the reply information are processed by said print job data processing means in this order.

19. The printer as claimed in any of claims 11–16 or 18 wherein said reception means, said print job data processing means, and said print control means can operate in parallel.

20. A recording medium recording a program for generating print data to be transmitted to a printer, said recording medium recording:

a print data generation function of generating print data based on an input document;

a reply information issuance function of issuing reply information at a predetermined position of print job data containing the print data; and a job processing state monitor function of monitoring a process state of the print job data based on part of the print data returned from the printer in accordance with the reply information, wherein the reply information includes intrinsically a predetermined destination and a reply instruction for replying said process state to said predetermined destination.

21. The recording medium as claimed in claim 20 wherein said reply information issuance function issues timing specification information for specifying return timing of the reply information in addition to the reply information.

22. The recording medium as claimed in claim 20 or 21 further including a reply information detection function of detecting the reply information returned from the printer and sending the detected reply information to said job processing state monitor function.

23. A printer system including a host computer and a printer comprising:

a first controller contained in the host computer, wherein the first controller generates print job data comprising print data and reply information located in the print job data at a predetermined position with respect to the print data, and transmits the print job data to the printer;

a second controller contained in the printer, wherein the second controller receives the print job data from the host computer, detects the reply information from the print job data, returns a part of the print data, which indicates a process state of the print job data based on the reply information to a predetermined destination included in the intrinsic data of said reply information, and controls printing based on the print data contained in the print job data; and a monitoring processor, which is external to the printer, receives the reply information returned from the printer, and monitors a processing state of the print data based on the reply information returned from the printer.

24. A recording medium containing a program to instruct a processor within a printer to perform a routine, comprising:

receiving print job data containing reply information and print data;

interpreting the print data, detecting the reply information from the print job data, and returning a part of the print job data, which indicates a process state of the print data based on the reply information to a predetermined destination external to the printer, wherein said predetermined destination is included in intrinsic data of said reply information, and printing based on interpretation of said print data.

25. The printer system as claimed in claim 1, wherein the print data processing means automatically returns the reply information to the predetermined destination and wherein said return of the reply information is not in response to any external command.

26. The printer system as claimed in claim 1, wherein the printer system in utilized in a network environment.

27. The printer system as claimed in claim 26, wherein the network environment includes a plurality of host computers that output information to the printer.

28. The printer as claimed in claim 11, wherein the printer is utilized in a network environment.

29. The printer as claimed in claim 28, wherein the network environment includes a plurality of host computers that output information to the printer.

30. The print system as claimed in of claim 7, further including reply information detection means for detecting the reply information returned from said print data processing means and sending the detected reply information to said job processing state monitor means.

31. The printer as claimed in claim 17, wherein said reception means, said print job data processing means and said print control means can operate in parallel.

\* \* \* \* \*